United States Patent
Coronella et al.

(10) Patent No.: US 8,499,471 B2
(45) Date of Patent: Aug. 6, 2013

(54) SYSTEM AND METHOD FOR ENERGY PRODUCTION FROM SLUDGE

(75) Inventors: Charles J. Coronella, Reno, NV (US); Victor R. Vasquez, Reno, NV (US)

(73) Assignee: The Board of Regents of the Nevada System of Higher Education, on Behalf of the University of Nevada, Reno, Reno, NV (US)

( * ) Notice: Subject to any disclaimer, the term of this patent is extended or adjusted under 35 U.S.C. 154(b) by 585 days.

(21) Appl. No.: 12/543,711

(22) Filed: Aug. 19, 2009

(65) Prior Publication Data
US 2010/0043445 A1 Feb. 25, 2010

Related U.S. Application Data

(60) Provisional application No. 61/090,546, filed on Aug. 20, 2008.

(51) Int. Cl.
*F26B 3/08* (2006.01)

(52) U.S. Cl.
USPC ........ 34/381; 34/413; 34/90; 34/138; 60/780; 75/445; 166/378; 166/258; 15/26; 15/38

(58) Field of Classification Search
USPC .. 34/370, 371, 381, 413, 80, 90, 138; 60/780; 15/26, 38; 166/378, 258; 75/445
See application file for complete search history.

(56) References Cited

U.S. PATENT DOCUMENTS

| | | | | |
|---|---|---|---|---|
| 2,094,786 A | * | 10/1937 | Flint | 34/164 |
| 3,981,690 A | * | 9/1976 | Chen et al. | 48/73 |
| 4,147,615 A | * | 4/1979 | Leas | 208/423 |
| 4,364,740 A | * | 12/1982 | Massey et al. | 44/621 |
| 4,535,065 A | * | 8/1985 | Klein et al. | 502/21 |
| 4,682,986 A | * | 7/1987 | Lee et al. | 48/210 |

(Continued)

FOREIGN PATENT DOCUMENTS

| | | | |
|---|---|---|---|
| DE | 4413923 A1 | * | 10/1995 |
| EP | 45297 A1 | * | 2/1982 |

(Continued)

OTHER PUBLICATIONS

Bellur et al., "Analysis of Biosolids Equilibrium Moisture and Drying," *Environmental Progress & Sustainable Energy*, vol. 28, No. 2, pp. 291-298, 2009.

(Continued)

*Primary Examiner* — Steve M Gravini
(74) *Attorney, Agent, or Firm* — Klarquist Sparkman, LLP

(57) ABSTRACT

The present disclosure provides, among other things, a system and process for drying a biosolid or sludge, such as wastewater sludge. The system and method include a fluidized bed dryer in which the sludge is dried. The fluidized bed includes bed media. In particular examples, the bed media is different than the sludge. The system and method can include additional features, such treating the sludge using a thermochemical process in a thermochemical reactor, such as a gasifier, to produce a fuel. The fuel is then combusted to produce energy and heat. The heat is recycled to the drier to help dry sludge. In particular examples, sludge input to the dryer is not first treated using a high-pressure dewatering technique. In some embodiments, the system and method include an anaerobic digester coupled to a combustion unit coupled to the dryer.

9 Claims, 11 Drawing Sheets

U.S. PATENT DOCUMENTS

| | | | | |
|---|---|---|---|---|
| 4,721,514 | A * | 1/1988 | Kikuchi et al. | 48/202 |
| 4,793,855 | A * | 12/1988 | Hauk | 75/445 |
| 4,823,712 | A * | 4/1989 | Wormer | 110/245 |
| 4,974,336 | A * | 12/1990 | Hahn | 34/443 |
| 5,059,404 | A * | 10/1991 | Mansour et al. | 423/201 |
| 5,089,031 | A * | 2/1992 | Kikuchi et al. | 48/77 |
| 6,084,147 | A * | 7/2000 | Mason | 588/19 |
| 7,157,167 | B1 * | 1/2007 | Muradov | 429/411 |
| 7,261,208 | B2 | 8/2007 | Stummer et al. | |
| 7,452,392 | B2 * | 11/2008 | Nick et al. | 48/198.1 |
| 7,866,386 | B2 * | 1/2011 | Beer et al. | 166/258 |
| 8,113,272 | B2 * | 2/2012 | Vinegar | 166/60 |
| 8,146,669 | B2 * | 4/2012 | Mason | 166/378 |
| 2006/0112639 | A1 * | 6/2006 | Nick et al. | 48/198.1 |
| 2007/0094929 | A1 * | 5/2007 | Kang et al. | 48/111 |
| 2007/0111051 | A1 * | 5/2007 | Muradov | 429/17 |
| 2009/0018221 | A1 * | 1/2009 | Klepper et al. | 518/703 |
| 2009/0194269 | A1 * | 8/2009 | Vinegar | 166/60 |
| 2010/0043445 | A1 * | 2/2010 | Coronella et al. | 60/780 |
| 2010/0275781 | A1 * | 11/2010 | Tsangaris et al. | 96/108 |

FOREIGN PATENT DOCUMENTS

| | | | | |
|---|---|---|---|---|
| JP | 09174099 | A * | 7/1997 | |
| JP | 2002256884 | A * | 9/2002 | |
| JP | 2002322902 | A * | 11/2002 | |
| JP | 2003185116 | A * | 7/2003 | |
| WO | WO 9741193 | A1 * | 11/1997 | |
| WO | WO 2009044218 | A2 * | 4/2009 | |

OTHER PUBLICATIONS

Bellur et al., "A Sustainable Process of Conversion of Sludge to Power," AIChE Annual Meeting, Academic, Salt Lake City, UT, Nov. 2009.

Bridle et al., "Energy and nutrient recovery from sewage sludge via pyrolysis," *Water Science and Technology*, vol. 50, No. 9, pp. 169-175, 2004.

Cavanaugh, "Kern Doesn't Want Los Angeles' Sludge," *The Daily News of Los Angeles*, Valley Edition, 3 pages, Apr. 16, 2005.

Chen et al., "Sludge Dewatering and Drying," *Drying Technology*, vol. 20, Nos. 4-5, pp. 883-916, 2002.

Groβ et al., "Energy recovery from sewage sludge by means of fluidized bed gasification," *Waste Management*, vol. 28, pp. 1819-1826, 2008.

Grossi, "Waste to a Wasteland," *The Fresno Bee*, 8 pages, Jun. 13, 2004.

Jacobs et al., "Selection Criteria for Sludge Drying Plants Belt, Drum and Fluidised Bed Dryers," presented at VDI Meeting, , 12 pages, Feb. 13-14, 2003.

Jaeger et al., "The Noell Conversion Process—a gasification process for the pollutant-free disposal of sewage sludge and the recovery of energy and materials," *Water Science and Technology*, vol. 41, No. 8, pp. 37-44, 2000.

Kasakura, "R&D Needs—Drying of Sludges," *Drying Technology*, vol. 14, No. 6, pp. 1389-1401, 1996.

McAuley et al., "A New Process for the Drying and Gasification of Sewage Sludge," *Water Engineering & Management*, pp. 18-23, 2001.

Mohamed et al., "Moisture sorption isotherms and heat of sorption of bitter orange leaves (*Citrus aurantium*)," *Journal of Food Engineering*, vol. 67, pp. 491-498, 2005.

Mujumdar, "Research and Development in Drying: Recent Trends and Future Prospects," *Drying Technology*, vol. 22, Nos. 1-2, pp. 1-26, 2004.

Oleszkiewica et al., "Wastewater biosolids: an overview of processing, treatment, and management," *Can. J. Civ. Eng.*, vol. 28, No. Suppl. 1, pp. 102-114, 2001.

Ramachandra, "Techno-Economic Analysis of Biosolids Equilibrium Moisture and Drying for Energy Utilization," *University of Nevada, Reno; The Graduate School*, 101 pages, 2008.

Rulkens et al., "Recovery of energy from sludge—comparison of the various options," *Water Science and Technology*, vol. 50, No. 9, pp. 213-221, 2004.

Schmidt et al., "Opportunities for Small Biomass Power Systems," prepared for the U.S. Department of Energy, 61 pages, 2000.

Shin et al., "Drying of Water Treatment Process Sludge in a Fluidized Bed Dryer," *Korean J. Chem. Eng.*, vol. 17, No. 1, pp. 22-26, 2000.

Vander Drift et al., "Ten residual biomass fuels for circulating fluidized-bed gasification," *Biomass and Bioenergy*, vol. 20, pp. 45-56, 2001.

Vasquez et al., "Municipal Sludge Drying and Conversion for Electricity Production," Proposal to California Energy Commission, 2006.

* cited by examiner

SYSTEM AND METHOD FOR ENERGY PRODUCTION FROM SLUDGE

CROSS REFERENCE TO RELATED APPLICATIONS

This application claims the benefit of, and incorporates by reference, U.S. Provisional Patent Application No. 61/090,546, filed Aug. 20, 2008.

FIELD

The present disclosure relates, generally, to a method and a system for producing energy from wastewater sludge. In a specific example, the method and system can be used to produce energy or heat that can be used to reduce the external energy requirements of a sludge dryer.

BACKGROUND

Domestic, commercial, and industrial wastewater is generally collected through an extensive network of sewers and transported to wastewater treatment plants, usually Publicly Owned Treatment Works (POTW). At a POTW, the wastewater is treated to a regulated level of cleanliness, and then subsequently discharged, or used as reclaimed water (e.g., for irrigation). The treatment processes can vary from location to location. Variation can depend on the age of the facility, the facility's capacity, local regulations, and the availability of capital. In the U.S., the infrastructure that leads to the production of biosolids includes an estimated 16,583 treatment works treating over 34 billion gallons of domestic sewage and other wastewater each day.

A typical POTW includes several stages, including preliminary treatment (screening and grit removal), primary treatment (sedimentation), secondary treatment (biological), and, in some cases, tertiary treatment. Solids removed in primary, secondary and tertiary treatment make up sludge or biosolid matter.

The U.S. Environmental Protection Agency (EPA) defines biosolids as solid, semisolid, or liquid residue generated during the treatment of domestic sewage in a treatment works. Due to increasingly stringent regulations to which municipal wastewater is required to be treated, the rate of production of biosolids has increased significantly.

Advancements in wastewater and sludge treatment technologies, increasingly stringent regulations, and population growth, have resulted in increased volumes of sludge which must be disposed of. More than $2 billion is spent annually treating and managing approximately 5.3 million dry metric tons of biosolids from POTW's in the United States. The rate of sludge production in the United States is forecast to increase to approximately 8.2 Mton/year (dry ton) by 2010, which is 19% increase from 1998. This trend indicates that the sludge production will continue to grow.

Traditional methods of sludge disposal include incineration, landfilling, and land application. Because of the reduced availability of land, the increased public concerns over food chain safety, EPA beneficial reuse policy, high disposal costs and harmful compounds, traditional disposal methods are no longer attractive.

Available techniques to reduce the volume of sludge include composting, dewatering, drying, and incineration. Dewatering is one of the most widely used techniques in the mass reduction of sludge from the wastewater treatment processes. However, final moisture contents of dewatered sludge cakes are generally higher than 75%.

SUMMARY

In one embodiment, the present disclosure provides a system for obtaining energy from sludge or a biosolid. The system includes a sludge source, a dryer, a thermochemical converter, and a generator. In some implementations, one or more of the sludge source, dryer, thermochemical converter, and generator are physically coupled. In a particular example, all of these components are physically coupled. In further implementations, at least one of the components is not physically coupled to the others, such as being located remotely from the other components.

In a specific example, the dryer is a fluidized bed dryer. In one example, the thermochemical converter is a gasifier. In another example, the thermochemical converter is a pyrolysis unit. The gasifier, in a particular example, is a fluidized bed gasifier.

In some embodiments, the system does not include a high efficiency dewatering unit between the sludge source and dryer. For example, the system does not include a high pressure dewatering device. In a specific example the dryer receives sludge in the normal state produced by a water treatment facility.

In further embodiments, the system includes a fluidized bed dryer having bed media, the bed media not being the sludge. In some configurations, the bed media has a different density than the sludge density. Density differences between the sludge and the bed media are used to selectively remove dried sludge particles from the dryer while at least substantially retaining bed media in the dryer. In a particular example, the bed media has a greater density that the sludge, such as a density sufficient to allow the bed media to at least substantially be retained in the dryer while allowing dried sludge particles to be blown out of the dryer. In yet further configurations, the bed media is an inert media, such as sand.

In another implementation of the above embodiment, the system includes a gravity separation device coupled in between the dryer and the gasifier. In a particular example, the gravity separator is a cyclone. The gravity separator can be used to selectively remove dried sludge particles from the dryer.

In yet another implementation of the above embodiment, the dryer does not use dried sludge as bed media. For example, the dryer does not include a feedback loop to recycle at least a portion of dried sludge back into the dryer.

In another embodiment, the generator includes a heat outlet and the dryer includes a heat inlet coupled to the heat outlet of the generator. In another implementation, a heat exchanger is placed between the gasifier and generator. An outlet of the heat exchanger is coupled to a heat inlet of the dryer and carries heated air from the heat exchanger to the dryer.

The system can include additional components. For example, the system can include an anaerobic digester. The digester includes a gas outlet that is attached to a combustion unit. The combustion unit burns biogas produced by anaerobic digestion. A heat outlet from the combustion unit is coupled to a heat inlet of the dryer so that heat from the burned biogas can be used to help dry sludge.

The present disclosure also provides a method from converting sludge or a biosolid to energy. In one embodiment, a sludge or biosolid is dried in a dryer. In a particular example, the dryer is a fluidized bed dryer. The dryer dries the sludge to a degree sufficient for a thermochemical process to be carried out on the sludge.

In some examples, a high efficiency dewatering process is not carried out on the sludge before it enters the dryer. In a particular example, a high pressure dewatering process is not performed on the sludge before it enters the dryer. In another implementation, the sludge is transmitted to the dryer in the form normally produced by a water treatment facility. In further implementations, when transmitted to the dryer, the sludge has a moisture content of at least about 60 wt %, at least about 65 wt %, at least about 70 wt %, at least about 75 wt %, at least about 80 wt %, or at least about 85 wt %. In some examples, after leaving the dryer, the sludge, now dried sludge, has a moisture content of less than about 40 wt %, less than about 35 wt %, less than about 30 wt %, or less than about 25 wt %.

The method, in some embodiments, includes separating dried sludge particles from bed media using gravity differences between the dried sludge particles and bed media. In particular examples, the bed media has a greater density than the dried sludge particles. In further examples, the bed media is an inert media, such as sand. The method can include, for example, separating dried sludge particles from bed media using a gravity separator, such as a cyclone.

In particular implementations of the above embodiments, the method does not include using dried sludge particles as bed media. In one example, the method does not include recycling dried sludge particles back into the dryer.

After being dried to a suitable degree, the dried sludge is converted to fuel using a thermochemical process. In one implementation, the sludge is gasified. In another implementation, the sludge is treated by pyrolysis. The thermochemical process provides a fuel, such as syngas. The fuel is converted to power, such as electricity.

In some cases, heat is recovered from the fuel before it is converted to power. For example, the gas can be passed through a heat exchanger. Heat recovered from the gas, in some examples, is used to help dry the sludge.

In further implementations of the method, converting the fuel to power creates heat. In particular examples, the heat is transmitted to the dryer to help dry the sludge.

The method can include additional processes and steps. For example, fuel from anaerobic digestion of waste can be used to produce heat for the dryer.

There are additional features and advantages of the subject matter described herein. They will become apparent as this specification proceeds.

In this regard, it is to be understood that this is a summary of varying aspects of the subject matter described herein. The various features described in this section and below for various embodiments may be used in combination or separately. Any particular embodiment need not provide all features noted above, nor solve all problems or address all issues in the prior art noted above.

DETAILED DESCRIPTION

Figure 1:
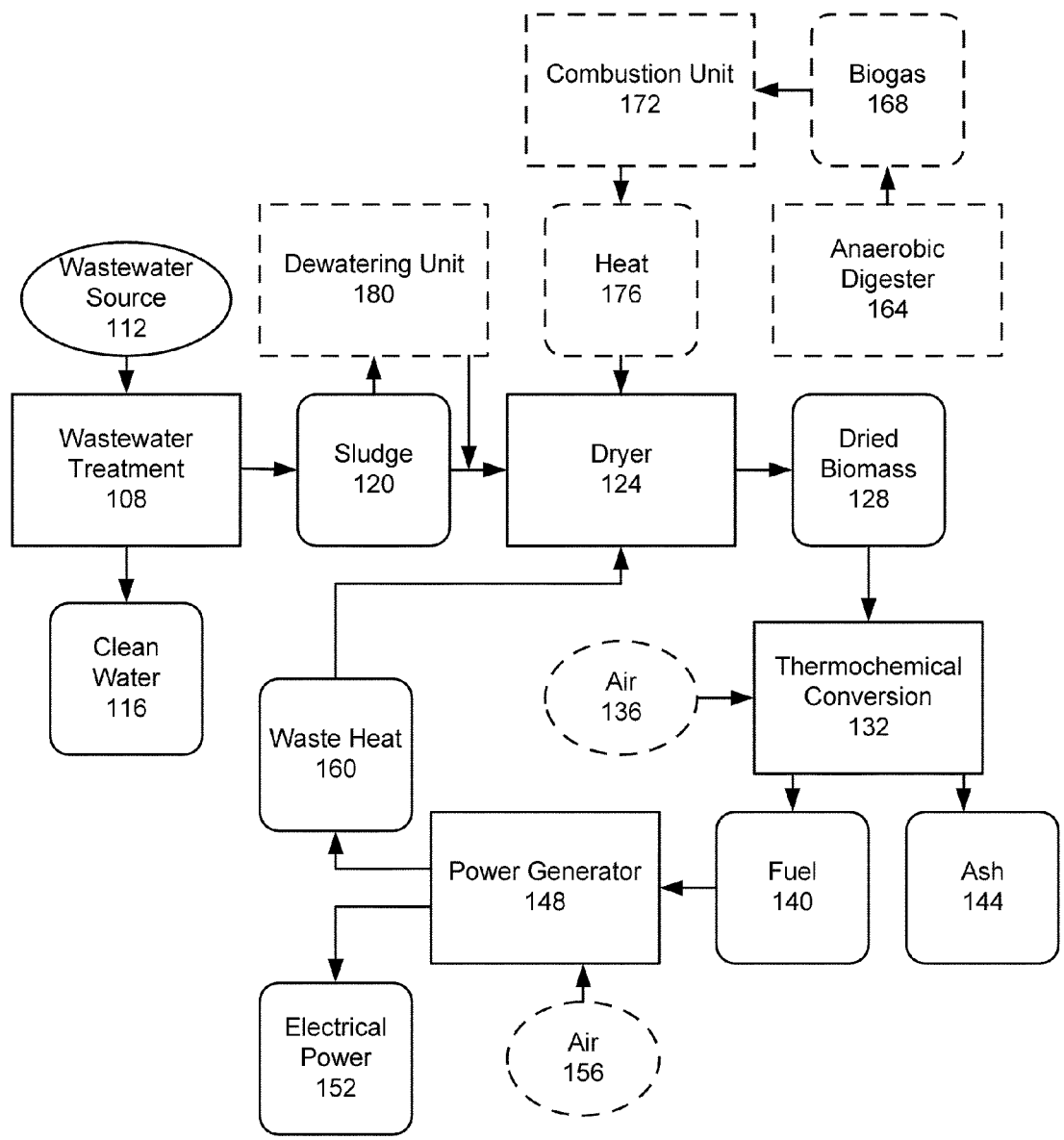
FIG. 1 is a schematic diagram of a system according to an embodiment of the present disclosure for producing energy from sludge.

Unless otherwise explained, all technical and scientific terms used herein have the same meaning as commonly understood by one of ordinary skill in the art to which this disclosure belongs. In case of any such conflict, or a conflict between the present disclosure and any document referred to herein, the present specification, including explanations of terms, will control. The singular terms "a," "an," and "the" include plural referents unless context clearly indicates otherwise. Similarly, the word "or" is intended to include "and" unless the context clearly indicates otherwise. The term "comprising" means "including;" hence, "comprising A or B" means including A or B, as well as A and B together. All numerical ranges given herein include all values, including end values (unless specifically excluded) and intermediate ranges.

Although methods and materials similar or equivalent to those described herein can be used in the practice or testing of the present disclosure, suitable methods and materials are described herein. The disclosed materials, methods, and examples are illustrative only and not intended to be limiting.

Definitions

In order to facilitate an understanding of the embodiments presented, the following explanations are provided.

"Dryer" refers to a device or process useful for drying sludge. A particularly attractive dryer for sludge drying is a fluidized bed. In some implementations, the fluidized bed includes a bed media having a density different than the density of a feed material to be dried in the dryer. In a particular configuration, the bed media has a density greater than the feed material density. In further configurations, the bed media is an inert media, such as sand. Using bed media having a different density that the feed material can be useful, for example, in removing dried feed material from the dryer while maintaining the bed media in the dryer.

In further implementations, the dryer does not use dried feed material as bed media. In particular examples, the dryer does not include a loop to return dried feed material to the dryer. In yet further examples, normal dryer inputs consist only of heat and feed material, although additional bed media can be added as needed.

In a particular implementation of a fluidized bed dryer, air is blown upwards through the bed media, and sludge is fed continuously to the bed, and continuously withdrawn with the air. Heat can be supplied by tubing through the bed. This fluidized bed dryer can have several advantages compared to other configurations, including compact design, rapid heat transfer between the tubes and the bed, and rapid heat and mass transfer between the sludge and the bed. Its operation can be flexible in the rate of feeding wet solids and in the size and moisture content of the solids. Although fluidized bed dryers are generally operated continuously, they can also be operated in batch or semi-batch modes, if desired.

Fluidized bed dryers can be designed according to the following equations and procedures. The particular described example was made for a medium-sized (40 MGD) wastewater treatment facility. The amount of sludge produced by such facilities is typically about 150 tons/day. The equations can be modified for larger or smaller facilities. In addition, alternative methods can be used to design the fluidized bed dryer.

The temperature inside the fluidized-bed dryer was chosen to be 333 K. At this temperature average residence time of sludge was taken from the batch fluidized-bed drying tests. The values for height to diameter ratio of fluidized-bed dryer, sludge to sand ratio in the bed and the ratio of superficial velocity to minimum fluidization velocity in the fluidized-bed dryer was assumed.

Calculated values were used for surface mean diameter of the sand particles, minimum fluidization velocity and initial moisture content of the sludge. Inlet temperature of sludge and the air entering the fluidized-bed dryer was assumed to be of ambient temperature.

For heat load calculations fluidized-bed dryer was assumed as perfectly insulated, i.e. heat loss to the surrounding was neglected.

The sludge input rate was chosen as:

$$s_{in} = 5688 \frac{kg}{hr}$$

This value was chosen to represent the sludge input rate from a 40 mgd plant. The following properties of air were defined:

$$\rho_g = 1.06 \frac{kg}{m^3}$$

$$\mu_g = 19.7 \cdot 10^{-6} \frac{kg}{m \cdot s}$$

The following properties of sand particles, the inert media, were defined, where $d_p$ is the sand particle diameter:

$$\rho_p = 2600 \frac{kg}{m^3}$$

$$d_p = 450 \cdot 10^{-6} \, m$$

The void fraction at minimum fluidization velocity was defined as, $\varepsilon_{mf} = 0.42$ and the particle sphericity was defined as $\phi = 0.8$ The average residence time of solids in the dryer was chosen as $t_r = 0.42$ hour based on empirical observations at 60° C. The dryer temperature, $T_d$, was selected as 333 K based on empirical fluidization studies.

The initial moisture content, $m_{in}$, was chosen as 0.849 and the final moisture content to be achieved, $m_f$, was chosen as 0.3. The height to diameter ratio, hd, was chosen as 0.5. A value for the fluidization velocity was estimated at:

$$v_{mf} = 0.04 \frac{m}{s}$$

Given:

$$\frac{1.75 \left( \frac{d_p \cdot v_{mf} \cdot \rho_g}{\mu_g} \right)^2}{\varepsilon_{mf}^3 \cdot \phi} + \frac{150(1 - \varepsilon_{mf})}{\varepsilon_{mf}^3 \cdot \phi^2} \cdot \frac{d_p \cdot v_{mf} \cdot \rho_g}{\mu_g} = \frac{d_p^3 \cdot \rho_g \cdot (\rho_p - \rho_g) g}{\mu_g^2}$$

$$u_{mf} := \text{Find}(v_{mf})$$

Based on these considerations, the minimum fluidization velocity, $u_{mf}$, for 450 micron sand particles was determined to be 0.14 m/s. The velocity ratio, $v_r$, of superficial to minimum fluidization was 10. The terminal velocity of the sand particles $U_t$, was calculated based on the following equations:

$$Dp_{star} := d_p \cdot \left[ \frac{\rho_g \cdot (\rho_p - \rho_g) \cdot g}{\mu_g^2} \right]^{\frac{1}{3}}$$

$$Dp_{star} = 18.51$$

$$u_{tstar} = \left( \frac{18}{Dp_{star}^2} + \frac{2.335 - 1.744 \cdot 0.8}{dp_{star}^{0.5}} \right)^{-1}$$

$$U_{tstar} = 3.69$$

$$U_t := \frac{U_{tstar}}{\left[ \frac{\rho_g^2}{\mu_g \cdot (\rho_p - \rho_g) \cdot g} \right]^{\frac{1}{3}}}$$

Calculations using the above equations provide a terminal sand particle velocity of 2.82 m/s. The superficial velocity, $u_{sup}$, was determined as the product of the minimum fluidization velocity and the velocity ratio or 1.36 m/s. Using this calculation:

$$U_{star} := u_{sup} \cdot \left[ \frac{\rho_g^2}{\mu_g \cdot (\rho_p - \rho_g) \cdot g} \right]^{\frac{1}{3}}$$

$$U_{star} = 1.77$$

Using Ustar and Dpstar values in FIG. 16 of chapter 3 of Kunii, et al., *Fluidization Engineering*, second edition (1991), the fluidized bed dryer can be operated in the bubbling flow regime.

The following factors and equations can be used to determine the bed dimensions:

Density of water $\rho_w = 1000 \frac{kg}{m^3}$

Sludge input temperature $T_s = 298 \, K$

Moisture in the sludge $m_s = S_{in} \cdot m_{in}$ $$m_s = 4.83 \cdot 10^3 \frac{kg}{hr}$$

Dry mass $D_n = S_{in} - m_s$ $$D_m = 858.89 \frac{kg}{hr}$$

-continued

Dried sluge from the drier (30% moisture) $D_s = \dfrac{D_m}{1 - m_{fin}}$ $D_s = 1.23 \cdot 10^3 \dfrac{\text{kg}}{\text{hr}}$ Water to be removed in the dryer $w_r = m_s - (D_S - D_m)$ $w_r = 1.23 \cdot 10^3 \dfrac{\text{kg}}{\text{hr}}$ Total amount of sludge in the dryer $S_t = S_{in} \cdot t_r$ $S_t = 2.39 \cdot 10^3$ kg Total amount of sand in the dryer $Sa = \dfrac{S_t}{r_s}$ $Sa = 1.19 \cdot 10^4$ kg Total mass in the dryer (sand + sludge) $ma_t = S_a + S_t$ $ma_t = 1.43 \cdot 10^4$ kg Volume $V = \dfrac{ma_t}{\rho_p}$ $V = 5.51$ m$^3$ Total volume (sludge + sand) $V_t = \dfrac{V}{1 - \varepsilon_{mf}}$ $V = 9.51$ m$^3$ Diameter of the dryer $dia = \sqrt[3]{\dfrac{V_t \cdot 4}{\pi \cdot h_d}}$ $dia = 2.89$ m Required height for the bed $\text{Height} = h_d \cdot dia$ Height = 1.45 m Area of bed $\text{Area} = \dfrac{\pi \cdot dia^2}{4}$ Area = 6.57 m$^2$ Transport disengaging height $TDH = 2 \cdot dia$ Total height of vessel $H_v = TDH + \text{Height}$ $H_v = 7.23$ m Total volume of vessel $T_v = \text{Area} \cdot Hv$ $T_v = 47.53$ m$^3$ The following equations described the quality of air to be used with the fluidized bed dryer:

$A_v = \text{Area} \cdot u_{mf} \cdot v_r$ $A_V = 3.21 \cdot 10^4 \dfrac{\text{m}^3}{\text{hr}}$ $\rho_{g298} = 1.16 \dfrac{\text{kg}}{\text{m}^3}$ $A_m = A_V \cdot \rho_{g298}$ $A_m = 3.72 \cdot 10^4 \dfrac{\text{kg}}{\text{hr}}$ Humidity of the exit air with $RH$ of 75% at 60° C. $H_a = \dfrac{w_r}{A_m}$ $H_a = 0.1199$ $\varepsilon = 0.42$ The following calculates illustrate an example of how to determine a blower design to be used with the fluidized bed dryer:

Efficiency of the blower $\eta = 0.7$

Pressure drop in the dryer $\Delta p_{dryer} = (\rho_n - \rho_g) \cdot g \cdot \text{Height} \cdot (1 - \varepsilon)$ $\Delta p_{dryer} = 2.14 \times 10^4$ Pa Total power needed by the blower $p_{dryer} = \dfrac{\Delta p_{dryer} \cdot A_V}{\eta}$ $P_{dryer} = 0.27$ MW The following calculations illustrated how to determine the heat needed to dry the sludge:

Latent heat of vaporization at 333 K $\lambda = 2357.88 \cdot 10^3 \dfrac{\text{J}}{\text{kg}}$ Specific heat of water $C_{pw} = 4184.63 \dfrac{\text{J}}{\text{kg} \cdot \text{K}}$ Specific heat of sand $C_{psa} = 835 \dfrac{\text{J}}{\text{kg} \cdot \text{K}}$ Specific heat of sludge $C_{ps} = 1390 \dfrac{\text{J}}{\text{kg} \cdot \text{K}}$ Heat supplied to dry biomass to attain the bed temperature $q_s = D_m \cdot C_{ps} \cdot (\tilde{T_d} T_s)$.

$q_s = 1.16 \cdot 10^4$ W

Sensible heat supplied to water $q_w = m_s \cdot C_{pw} \cdot (\tilde{T}_d - T_s)$.

$q_w = 1.96 \cdot 10^5$ W

Latent heat of vaporization of water $p_1 = w_r \cdot \lambda$ $q_1 = 2.92 \cdot 10^6$ W Total heat required to dry the biosolids to 30% moisture $Q_{total} = q_1 + q_w + q_s$ $Q_{total} = 3.13 \cdot 10^6$ W "Equilibrium Moisture Content" refers to the moisture content in a biosolid that is in thermodynamic equilibrium with moisture in the surrounding atmosphere at a given relative humidity, temperature and pressure. Modeling of EMC in biomass as a function of the water activity can be used to model and optimize drying processes. EMC can also be used for predicting biological activity and rate of deterioration, and predicting a time for stable storage. EMC can also be used in designing the equipment used for drying, to prevent over drying and minimize energy use, and to improve dried product quality.

There are many models that can be used to correlate EMC with water activity. These models are generally are semi-theoretical and empirical in nature. The Chung-Pfost Equation was developed based on the assumption that the change in free energy for sorption is related to moisture content. The original Henderson equation was developed based on the Gibbs' thermodynamic adsorption equation and describes well the behavior of many hygroscopic materials, like foodstuffs and agricultural materials. The original Oswin equation was simply a mathematical series expansion for sigmoid shaped curves and purely empirical in nature. The original Halsey equation was developed based on multilayer condensation. Generally, a particular model is shown as having some success fitting the EMC data for a particular biological material for a given range of relative humidity and temperature.

Vasquez and Coronella developed a model, termed the Vasquez-Coronella sorption mixing (VCSM) model, to describe equilibrium moisture in heterogeneous biomass substrates. The model is based on satisfying the chemical potential equilibrium conditions for water between three phases: gas, bound moisture, and free moisture. Contributions to the chemical potential of the bound phase include adsorption, swelling, and mixing. Following is a brief summary of the use of the model.

Equilibrium moisture in the solid is portioned between the water bound phase, $\theta$, and the free water phase $\alpha$, both defined as mass ratios to the dry solid. Thus, the EMC of the solid phase is the sum $\theta+\alpha$. At equilibrium, the following two equations are solved to find $\theta$ and $\alpha$:

$$\theta(\alpha+\theta)^{\Delta}=\alpha(\sigma-\theta)^{\Delta F}$$

$$(\alpha+\theta)H_R=\alpha^{\Delta F}$$

Where $\Delta F$ accounts for contributions from both mixing and swelling. $\sigma$ is an adjustable parameter which describes the adsorption capacity of the solid phase, $\Delta\tilde{\epsilon}$ is an adjustable parameter which characterizes the difference in adsorption energy between water in the $\alpha$ phase and water in the $\theta$ phase. HR is the relative humidity.

For any given solid, the above equations can be solved to find the total EMC=$\theta+\alpha$. The contributions to the chemical potential of mixing and swelling are given in $\Delta F$ as follows:

$$\Delta F=\mu_{mix}+\mu_{swell}$$

$$\mu_{mix}=\ln(1-\phi_p)+\phi_p+\chi\phi_p^2$$

$$\mu_{swell}=\phi_p^{1/3}-\phi_p^{5/3})$$

Where $\chi$ is an adjustable parameter, analogous to the Flory-Huggins binary interaction parameter, $\phi_p$ is the volume fraction of the bio-polymer given by $$\phi_p = \frac{\tilde{v}_{pw}}{(\alpha+\theta)+\tilde{v}_{pw}}$$

$\tilde{v}_{pw}$ is an adjustable parameter that represents the specific volume ratio of biopolymer to water. Thus, empirical EMC data can be fit to the model by using four adjustable parameters ($\sigma$, $\tilde{v}_{pw}$, $\chi$, and $\Delta\tilde{\epsilon}$). While evaluating these parameters, $\alpha$ and $\theta$ are typically simultaneously evaluated using the first two equations. Suitable algorithms can be used to fit the model parameters from empirical data. These parameters within the assumptions of the model provide more insight into the nature of the system than purely empirical based ones.

"Gassifier" refers to an apparatus that converts carbonaceous materials, such as sludge, to a syngas fuel. The gasification reaction typically uses relatively high temperature and oxygen and/or steam to accomplish the conversion. Although any suitable gasifier or gasification technique can be used, the following discussion provides an example of calculations for selecting gasifier parameters.

Biosolids are represented by the general formula $C_5H_7O_2N$. As discussed below, nitrogen content was neglected for purposes of calculation. Air was considered as a gasifying agent. The stoichiometric amount of air required for complete combustion is determined in the following example. Optimum conditions, such as temperature, ER and the carbon conversion, were taken from Manya, et al., *Energy & Fuels*, 19, 629-636 (2005).

The gasification products contain $CO_2$, $CO$, $H_2$, $CH_4$, $N_2$, $H_2O$ and un-burnt carbon. The reaction taking place in the gasifier are oxidation ($C+O_2=CO_2$); steam gasification ($C+H_2O=CO+H_2$); Bouduard reaction ($C+CO_2=2CO$); methanation ($C+2H_2=CH_4$); and water gas-shift reaction ($CO+H_2O=CO_2+H_2$). For elemental balance all the above equations were considered.

Using the heat of combustion values for gases from the gasifier, fuel content of flue gas was determined. Using the gas flow rate from the gasifier and the residence time of gas volume of the gasifier was determined. This reactor for these calculations was configured as a bubbling fluidized bed of sand into which dried biosolids were fed. Ash was elutriated with the syngas and separated in a cyclone.

Dried Sludge from the dryer $D_S = 1227 \frac{\text{kg}}{\text{hr}}$

Moisture in the dried sludge $m_{out}$ 0.3

Water in the dried sludge $W_a D_s m_{out}$ $$W_a = 368.1 \frac{\text{kg}}{\text{hr}}$$

Molecular weight of water $M_W = 18 \frac{\text{gm}}{\text{mol}}$

Moles of water $W_{am} = \frac{W_a}{M_W}$ $$W_{am} = 5.681 \frac{\text{mol}}{\text{sec}}$$

Assuming that the total dry solids consists of 60% dry biomass and 40% ash:

$$\text{bio} = .(D_s - W_a) \cdot 0.6$$

$$\text{bio} = 0.143 \frac{\text{kg}}{\text{sec}}$$

$$\text{Ash} = .(D_s - W_a) \cdot 0.4$$

$$\text{ash} = 0.095 \frac{\text{kg}}{\text{sec}}$$

Molecular weight of biomass $M_{wb} = 99 \frac{\text{gm}}{\text{mol}}$

Moles of biomass $\text{bio}_m = \frac{\text{bio}}{M_{wb}}$ $$\text{bio}_m = 1.446 \frac{\text{mol}}{\text{s}}$$

The following calculations provide an elemental analysis for the gasification reaction:

Carbon $Ca = 5 \cdot \text{bio}_m$ $$Ca = 7.23 \frac{\text{mol}}{\text{s}}$$

Hydrogen present in dry biomass and water $Hy = 7 \cdot \text{bio}_m + 2 \cdot W_{am}$ $$Hy = 21.483 \frac{\text{mol}}{\text{s}}$$

Oxygen required for complete combustion $O_r = Ca + \frac{Hy}{4}$

-continued $$O_r = 12.601 \frac{mol}{s}$$

Assuming the value of Equivalence ratio λ from Manya, et al.:

$$\lambda = 0.33$$

Oxygen supplied $O_s = \lambda \cdot O_r$ $$O_s = 4.158 \frac{mol}{s}$$

Total oxygen atoms in the reactor $Ox = 2 \cdot bio_m + W_{am} \cdot 1 + O_S \cdot 2$ $$Ox = 16.889 \frac{mol}{s}$$

Nitrogen molecules supplied through air $Ni = \frac{O_S}{0.21} \cdot 0.79$ $$Ni = 15.643 \frac{mol}{s}$$

The flue gas composition was calculated assuming the carbon conversion in the gasifier and found to be 10% Char, 56% $CO_2$; 28% CO, and 6% $CH_4$.

TABLE 1

Thermodynamic properties of flue gases, biomass, ash and char present in the gasifier.

| | Gasifier output (gmol/s) | $\Delta H_{form}$ (kJ/g mol) | $\Delta H_{comb}$ (kJ/g mol) | Cp (J/g mol K) |
|---|---|---|---|---|
| C (char) | 0.7182 | 0 | −393.51 | 17.15 |
| CO | 2.0109 | −110.53 | −282.98 | 25.83 |
| $CO_2$ | 4.0218 | −393.51 | 0 | 40.17 |
| $CH_4$ | 0.4309 | −74.8 | −802.31 | 47.3 |
| $H_2O$ | 6.8495 | −241.8 | 0 | 31.17 |
| $H_2$ | 2.9964 | 0 | −241.8 | 24.44 |
| $N_2$ | 15.7075 | 0 | 0 | 25.6 |
| $O_2$ | 0.0000 | 0 | 0 | 27.11 |
| Biomass | | −891 | | 176 |
| Water (L) | | −285.85 | | 75.24 |
| Ash | | 0 | | 0.8 |

Fuel value of syn gas was calculated using flue gas composition and by taking into account of all the gases present.

TABLE 2

Gasifier output and the fuel value of flue gas

| | Gasifier output (gmol/s) | ΔHcomb (kJ/g mol) | Fuel Value (kW) |
|---|---|---|---|
| C (char) | 0.72 | −393.51 | |
| CO | 2.01 | −282.98 | −569 |
| CO2 | 4.02 | 0 | 0 |
| CH4 | 0.43 | −802.31 | −345.7 |
| H2O | 6.84 | 0 | 0 |
| H2 | 3.01 | −241.8 | −727.6 |
| N2 | 15.68 | 0 | 0 |
| O2 | 0.00 | | |
| Total | 31.99 | | −1642.3 |

Using gasifier output and the density of the gas flue gas flow rate was calculated. From The flow rate and the fuel value fuel content was calculated as shown in Table 3.

TABLE 3

Flue gas flow rate and the fuel value

| Gas Flow rate (L/s) | 2948 |
|---|---|
| Fuel Value (kW) | 1642.3 |
| Fuel Content (kJ/L) | 0.56 |

The following calculations illustrate determination of sand particles for use in the gasifier:

Sand particle diameter $D_p = 450 \cdot 10^{-6}$ m $$\rho_{sand} = 2600 \frac{kg}{m^3}$$

$$\mu_{gas} = 0.00004232 \frac{kg}{m \cdot s}$$

Residence time of flue gas in gasifier $t_r = 4$ s

Air supplied to gasifier $m_{air} = 575.65 \frac{gm}{s}$ $$\rho_{gas} = 0.3138 \frac{kg}{m^3}$$

$$Q_{air} = \frac{m_{air}}{\rho_{gas}}$$

$$Q_{air} = 1.834 \frac{m^3}{s}$$

Volumetric flow rate of flue gas from gasifier (Table 4.3)

$$Q_{gas} = 2.9 \frac{m^3}{s}$$

The terminal velocity of the sand particles was calculated as follows:

$$Dp_{star} := Dp \cdot \left[ \frac{\rho_{gas} \cdot (\rho_{sand} - \rho_{gas}) \cdot g}{\mu_{gas}^2} \right]^{\frac{1}{3}}$$

$Dpstar = 7.411$ $$U_{tstar} := \left( \frac{18}{Dp_{star}^2} + \frac{2.335 - 1.744 \cdot 0.8}{Dp_{star}^{0.5}} \right)^{-1}$$

$Utstar = 1.486$ $$U_t := \frac{U_{tstar}}{\left[ \frac{\rho_{gas}^2}{\mu_{gas} \cdot (\rho_{sand} - \rho_{gas}) \cdot g} \right]^{\frac{1}{3}}}$$

Terminal Velocity of the sand particles $U_t = 3.301 \frac{m}{s}$

The minimum fluidization velocity was calculated as follows:

$\phi = 0.8$   $\varepsilon_{mf} = 0.42$

Guess value $v_{mf} = 0.04 \frac{m}{s}$

Given $$\frac{1.75 \cdot \left(\frac{Dp \cdot v_{mf} \cdot \rho_{gas}}{\mu_{gas}}\right)^2}{\varepsilon_{mf}^3 \cdot \phi} + \frac{150 \cdot (1-\varepsilon_{mf})}{\varepsilon_{mf}^3 \cdot \phi^2} \cdot \frac{Dp \cdot v_{mf} \cdot \rho_{gas}}{\mu_{gas}} = \frac{Dp^3 \cdot \rho_{gas} \cdot (\rho_{sand}-\rho_{gas}) \cdot g}{\mu_{gas}^2}$$

$u_{mf} = Find(v_{mf})$ $u_{mf} = 0.066 \frac{m}{s}$

Superficial velocity to be 10 times the minimum fluidization velocity $u_{sup} = u_{mf} \cdot 10$ $U_{star} := u_{sup} \cdot \left[\frac{\rho_{gas}^2}{\mu_{gas} \cdot (\rho_{sand}-\rho_{gas}) \cdot g}\right]^{\frac{1}{3}}$ $U_{star} = 0.298$ By using Ustar and Dpstar values in FIG. 16 of chapter 3 from Kunii et al., the fluidized bed gasifier was operated in bubbling flow regime $area = \frac{Q_{air}}{u_{sup}}$ $area = 2.769\ m^2$ Diameter of the gasifier $dia = \sqrt{\frac{area \cdot 4}{\pi}}$ $dia = 1.878\ m$ $volume = Q_{gas} \cdot t_r$ $volume = 11.6\ m^3$ Total height of vessel $H_t = \frac{volume}{\frac{\pi \cdot dia^2}{4}}$ $H_t = 4.189\ m$ Transport disengaging height $TDH = 2 \cdot dia$ Bed height $h_b = H_t - TDH$ $h_b = 0.434\ m$ $\varepsilon = 0.42$ $\rho_{airb} = 1.187 \frac{kg}{m^3}$ $Q_b = \frac{m_{air}}{\rho_{airb}}$ Efficiency of the blower $\eta = 0.7$ From the gasifier design $Q_b = 0.485 \frac{m^3}{s}$ $\Delta P_{gasifier} = (\rho_{sand}-\rho_{gas}) \cdot g \cdot h_b \cdot (1-\varepsilon)$ $\Delta P_{gasifier} = 6.417 \times 10^3\ Pa$ $Power = \frac{\Delta P_{gasifier} \cdot Q_b}{\eta}$ $Power = 4.446 \times 10^3\ W$ During gasification, fuel nitrogen is typically liberated mainly as ammonia, hydrogen cyanide, molecular nitrogen, or as heavy aromatic compounds, while a smaller part of the nitrogen is retained in solid char. Independent of the fuel gasified, more $NH_3$ is typically formed than other nitrogenous compounds in most gasifiers. The $NH_3$ content in the product gas generally depends, at least in part, on the nitrogen content of the fuel. The fraction of the fuel nitrogen that is converted to $NH_3$ may be affected by several parameters, including gasification temperature, heating rate, pressure, residence time of fuel in the reactor, as well as the devolatilization rate of fuel and the nitrogen functionality in fuel structure. The ammonia and other compounds formed during gasification can form $N_{ox}$ species when combusted, which can be removed from the flue gas by appropriate gas cleaning techniques. The presence of nitrogen has been neglected in the above calculations.

"Gravity separator" refers to a device which separates components based on their specific gravity, or density. For example, solid material can be separated from gaseous material using a cyclone. In some examples, gravity separators are used in the present disclosure. In a particular example, a gravity separator, particularly a cyclone, is used to remove ash particles from a gasifier. Cyclones are also used, in some examples, to separate bed media from dried sludge particles in the fluidized bed dryer.

The following calculations illustrate a procedure for configuring a cyclone to remove ash particles from the gasifier. The pressure drop in the cyclone was assumed to be 2000 Pa. The range for the pressure drop, in some examples, is between about 250 Pa and about 4000 Pa. The cyclone was studied as various Stk50 (Stokes number) values, which are generally selected to be in the range from about 0.0014 to about 0.4. Under these conditions, the Euler number is:

$$Eu \cong \sqrt{\frac{12}{Stk_{50}}}$$

By definition:

$$Eu = \frac{\Delta P}{\frac{1}{2}\rho_g v^2}$$

Both Eu and $Stk_{50}$ are dimensionless parameters. In the above equation, $\sigma_g$ is the gas density. These equations were used to determine the characteristic velocity, v. The definition of the Stokes number was used to determine the cyclone diameter, D:

$$Stk_{50} = \frac{d_p^2 \rho_p v}{18 \mu D}$$

Where $d_p$ is the particle size, $\rho_p$ is the particle density, $\mu$ is the gas velocity, and D is the nominal cyclone diameter. The total has flow through the cyclone can be calculated from:

$$V = \frac{\pi}{4}D^2 v$$

Where V is the volumetric flow rate.

The Stokes value can be varied until a desired combination of number of cyclones, cyclone diameter, and velocity is obtained. Typically, the cyclone diameter is selected to be between about 5 cm and about 1 m. Typically, the number of cyclones is selected to be ten or fewer.

TABLE 4

Cyclone diameter and flow rates for different initial Stokes values.

| Stk. 50 (guess value) | Eu | Characteristic Velocity V (m/s) | Cyclone Diameter D (m) | Flow rate m³/s |
|---|---|---|---|---|
| 0.001 | 92.582 | 11.396 | 1.282 | 14.711 |
| 0.003 | 61.237 | 14.013 | 0.690 | 5.234 |
| 0.005 | 48.990 | 15.667 | 0.494 | 2.996 |
| 0.007 | 42.008 | 16.918 | 0.392 | 2.040 |
| 0.009 | 37.354 | 17.941 | 0.329 | 1.521 |
| 0.010 | 33.968 | 18.814 | 0.285 | 1.200 |
| 0.012 | 31.363 | 19.581 | 0.253 | 0.983 |
| 0.014 | 29.277 | 20.266 | 0.228 | 0.827 |
| 0.016 | 27.559 | 20.888 | 0.208 | 0.711 |

In a particular example, the cyclone diameter is 0.5 m.

"Heat exchanger" refers to a device for transporting heat from one substance to another substance. Heater exchangers can be useful, for example, in transferring heat generated from burning fuel obtained from sludge, such as syngas from as gasification unit, to other processes, such as the dryer. The following calculations illustrate a method for selecting a suitable heat exchanger.

Some of the heat exchanger calculations are based on data related to the particular genset to be used. For example, the genset may determine the volumetric flow rate and temperature of the exhaust gas from the genset. By energy balance, the outlet temperature of the gas leaving the heat exchanger can be calculated. Using the outlet temperature of the gas, the log mean temperature difference (LMTD) and heat area can be calculated.

The volumetric flow rate of gas from the genset $Q_{gas} = 10607 \frac{ft^3}{min}$ $\rho_{gas} = 0.52 \frac{kg}{m^3}$ Assuming the gas property=air property at 680K (genset outlet gas temperature):

$c_{pgas} = 1069 \frac{J}{kg \cdot K}$ $u = 30 \frac{W}{m^2 \cdot K}$ $c_{pair} = 1005 \frac{J}{kg \cdot K}$ From the genset $T_{ingas} = 680$ K Inlet air temperature to the dryer $T_{inair} = 298$ K $T_{outgas} = 400$ K $T_{outair} = \frac{m_{gas} \cdot c_{pgas} \cdot (T_{ingas} - T_{outgas})}{m_{air} \cdot c_{pair}} + T_{inair}$ $T_{outair} = 401.5$ K $Q = m_{gas} \cdot c_{pgas} \cdot (T_{ingas} - T_{outgas})$ $Q = 7.77 \times 10^5$ W $\Delta T_1 = T_{ingas} - T_{outair} \quad \Delta T_2 = T_{outgas} - T_{inair}$ -continued $\Delta T_{lmtd} = \frac{\Delta T_1 - \Delta T_2}{\ln \frac{\Delta T_1}{\Delta T_2}}$ $A = \frac{Q}{\Delta T_{lmtd} \cdot u}$ $A = 148$ m²

General Discussion

Dried sludge has a Gross Calorific Value (GCV) between 15-20 MJ/kg. The conversion of sludge to a useful form of energy, also called bio-energy, can be achieved using thermo-chemical conversion processes. Equivalence ratio (ER) is defined as the amount of air added relative to the amount of air required for stoichiometric combustion of a fuel. Depending on the ER, several different thermal processes available for the transformation of energy in sludge are, combustion (ER_1), gasification (ER=0.2-0.5), and pyrolysis (ER=0), each has distinct advantages and disadvantages.

The recent advent and commercialization of the integrated gasification combined cycle (IGCC) for coal has allowed thermal efficiencies as high as 45%. Sludge with moisture content less than 30% can be effectively integrated with gasification processes in order to extract energy from it by itself or when mixed with some other fuel such as coal, wood and municipal solid waste. For this purpose, drying is important with respect to degree of mass reduction, increase in calorific value, total cost and environmental effects after dewatering.

The conversion of sludge to useful form of energy, also called bio-energy, can be achieved using a number of different technological solutions that can be separated into two basic categories, namely thermo chemical processes and biochemical/biological processes. One described process uses air gasification to produce a synthesis gas, followed by combustion of the gas in a generator, which in turn generates electrical power. A simplified diagram is shown in FIG. 1.

In FIG. 1, an integrated system 100 includes a wastewater treatment unit 108 that carries out a wastewater treatment process on a wastewater source 112 to produce clean water 116 which is at least clearer than wastewater source 112. Although shown as a single unit/process, the wastewater treatment unit 108 may include multiple units carrying out one or more processes. The wastewater treatment unit 108 is, in some example, in physical proximity with one or more other components of the system 100. In other examples, the wastewater treatment unit is remote from one or more components of the system 100.

Sludge 120 is produced in the wastewater treatment unit 108. In some cases, the sludge 120 has a moisture content of between about 70% and 90% water by weight. The sludge 120 is transmitted to a dryer 124. In some cases, the dryer 124 is a fluidized bed dryer. The dryer 124 in some embodiments is physically proximate one or more other components of the system 100. In other embodiments, the dryer 124 is remote from one or more of the components of the system 100. In the dryer 124, the moisture content of the sludge 120 is reduced and its caloric value increased. The dryer 124 produces dried biomass 128. In some implementations, the dryer 124 includes an external energy source (not shown). In further implementations, the dryer 124 uses heat produced by other components of the system 100. In particular examples, the dryer 124 uses heat from an external energy source and from one or more components of the system 100. The dryer 124 typically is selected and configured to reduce the water content of the biomass 128 to a level sufficient to allow it to be used as a fuel source in a thermochemical conversion unit.

The dried biomass 128 is transmitted to a thermochemical conversion unit 132. In some embodiments, the thermochemical conversion unit 132 is a gasification unit. In further embodiments, the thermochemical conversion unit 132 is a pyrolysis unit. In some cases, such as when the thermochemical conversion unit 132 is a gasification unit, an air source 136 is coupled to the thermochemical conversion unit. The thermochemical conversion unit 132 typically produces a fuel 140, such as syngas, and one or more byproducts, such as ash 144. In some cases, the thermochemical conversion unit 132 is located proximate other components of the system 100. In other cases, however, the thermochemical conversion unit 132 may be located remote from one or more other components of the system 100.

The fuel 140 is transmitted to a power generator 148, such as a gas turbine or genset. The power generator 148 typically burns the fuel 140 to produce electrical power 152. In some implementations, the system 100 includes an air source 156 for use by the power generator 148. The power generator 148 typically produces waste heat 160 during power generation. This heat 160 may be captured, such as using a heat exchanger (not shown), and transmitted to the dryer 124. Using the waste heat 160 from the power generator 148 can reduce the amount of external energy needed to operate the dryer 124, thus making the system 100 more efficient and economical to operate.

The system 100 can include additional components. For example, the system 100 optionally includes an anaerobic digester 164. The anaerobic digester 164 produces biogas 168. A combustion unit 172 burns the biogas to generate heat 176. The heat 176 is transmitted to the dryer 124 to help dry the sludge 120. Heat from the anaerobic digester 164 can be used to reduce the external energy costs of drying the sludge 120.

In another configuration, the system 100 includes a dewatering unit 180 between the wastewater treatment unit 108 and the dryer 124. In some examples, the dewatering unit 180 is a mechanical dewatering unit which reduces the moisture content of the sludge 120 before entering the dryer 124. In some examples, the moisture content of the sludge is at least about 55 wt %, at least about 60%, or at least about 65% after leaving the dewatering unit 180. In particular examples, the dewatering unit 180 is a low pressure dewatering unit or is not a high-efficiency dewatering unit, such as not being a high pressure dewatering unit. In a specific example, the dewatering unit 180 is a belt/filter press.

EXAMPLE 1

Determination of Sludge Properties and Fluidized Bed Dryer Design

Materials and Methods
Equilibrium Moisture Content

For the EMC determination, digested biosolids taken from Truckee Meadows Water Reclamation Facility (TMWRF), Reno, which has a typical moisture content of about 85% (wet basis) were used. The samples were kept in polyethylene bags and stored in a refrigerator at about 5° C. The static desiccator technique was used for EMC determination at constant temperature by exposing the biosolids samples to constant relative humidities maintained by saturated salt solutions.

Figure 2:
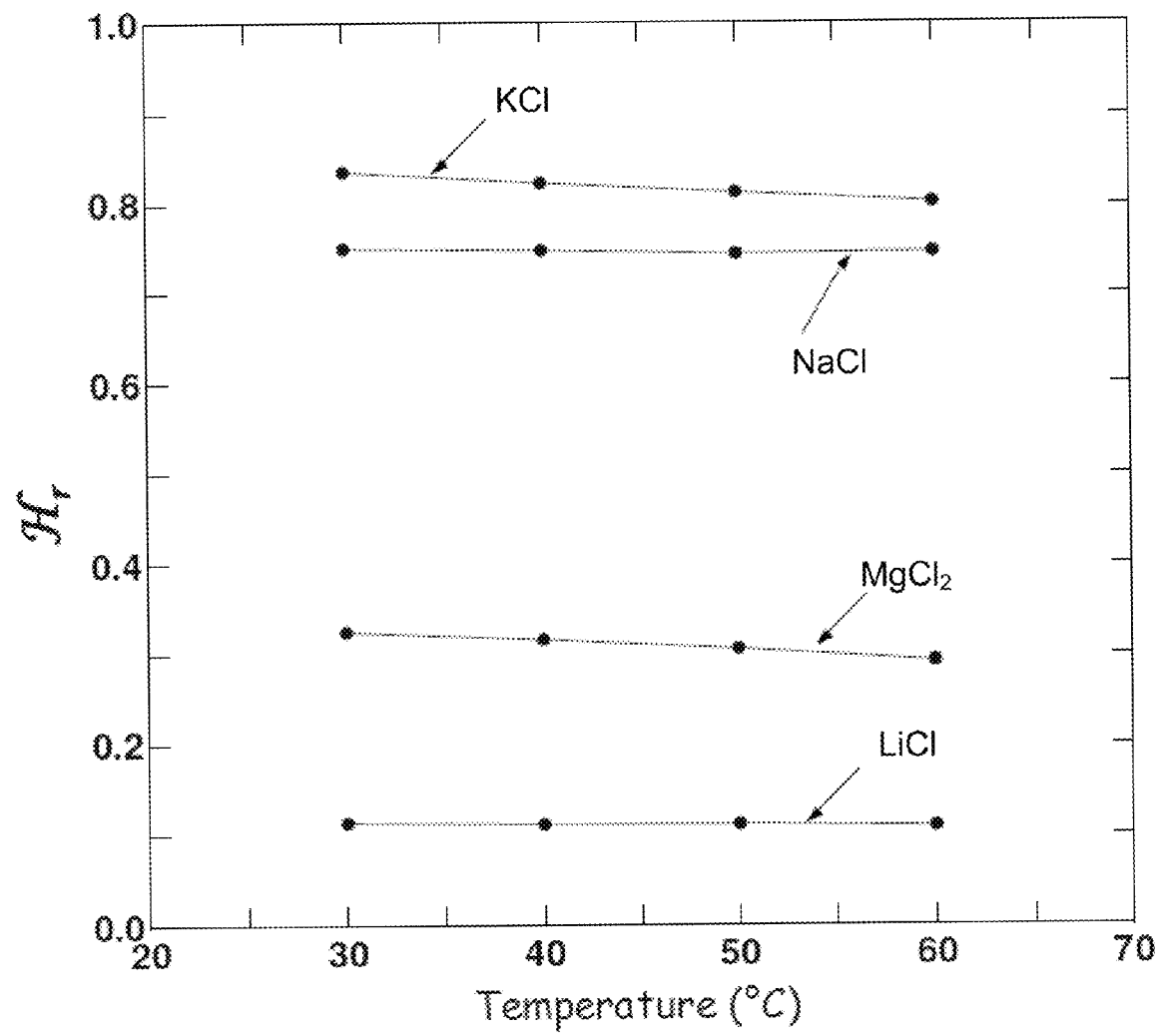
FIG. 2 is a graph of relative humidity versus temperature for various salts.

Glass desiccators containing salt solutions were used as humidity control chambers to fix the relative humidity levels from 0.10 to 0.84. These were kept in temperature controlled environments at four different temperatures (30, 40, 50, 60° C.). The four salts used were lithium chloride, magnesium chloride, sodium chloride, and potassium chloride. The salt solutions were prepared by dissolving the salt crystals in distilled water at room temperature. Excess salt was added to the saturated solutions to ensure constant relative humidity conditions prevailed throughout the study. The relative humidities of saturated salts solutions at different temperature are shown in FIG. 2.

Biosolid samples weighing about 5 g each were placed in a petri-dish on a platform inside the desiccators to avoid direct contact between the biosolid samples and the salt solutions. The desiccators were placed in a water bath for temperature control. The time for the sample to reach equilibrium varied from 5-7 days depending on the water activity and temperature. The biosolid samples were weighed with an accuracy±0.1 mg. Equilibrium was determined when three consecutive weight measurements showed a difference less than 1 mg. When the EMC was reached, the moisture content of the sample was determined by oven drying at 105° C. for 24 hours. All tests were replicated three times for various combinations of temperature and relative humidity, and average values of EMC were used in the analysis of data.

Fluidized Bed Dryer

The sludge particles can be fluidized in a bed of inert solids. Specifically sand was chosen as the inert medium because it is chemically benign, it is cheap, and is available in suitable particle sizes. The volume surface mean diameter of sand particles was determined by screen analysis.

Figure 3:
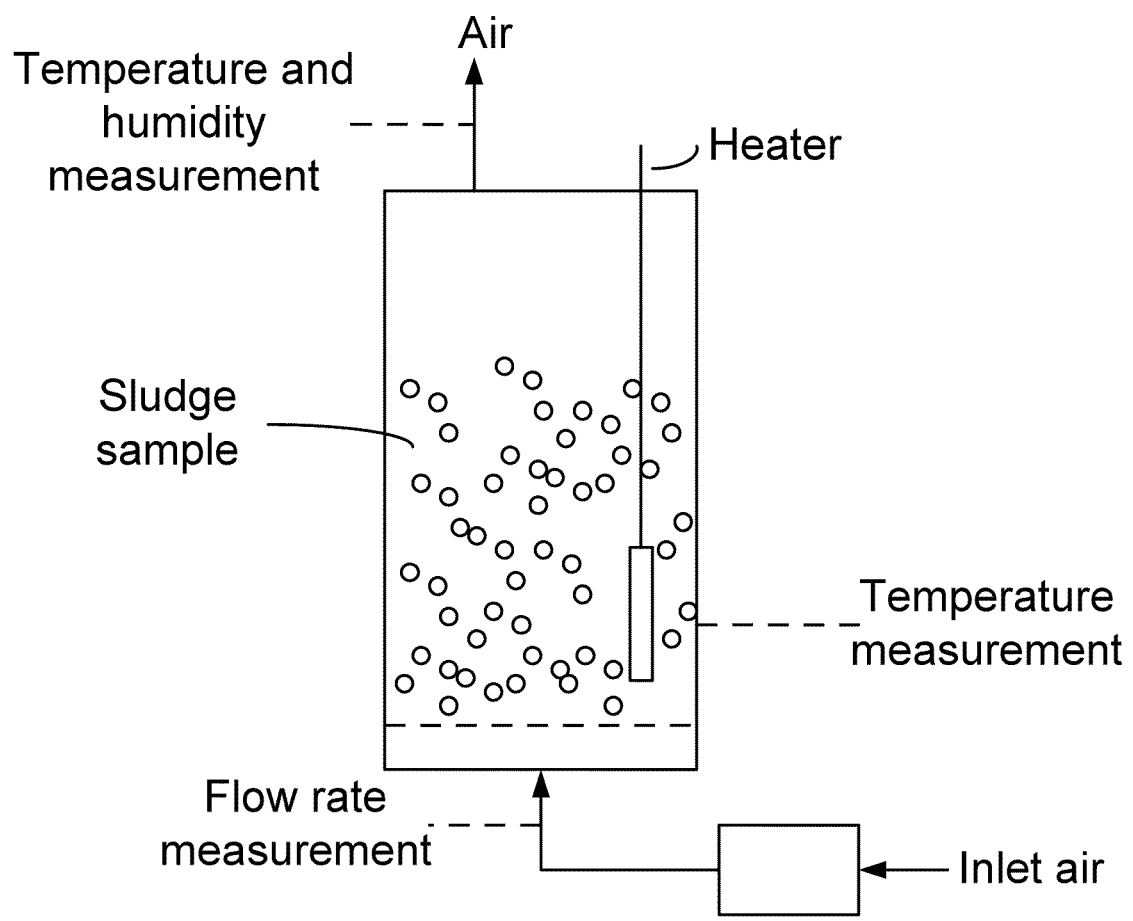
FIG. 3 is a schematic diagram of a fluidized bed dryer useable in an embodiment of the present disclosure.
Figure 4:
FIG. 4 is photograph of a fluidized bed dryer according to an embodiment of the present disclosure.

For fluidization studies, a batch fluidized-bed dryer was constructed, as illustrated in FIG. 3. The fluidized bed drying chamber included a cylindrical glass column of 3-inch diameter as shown in FIG. 4. Air was distributed through a perforated plate with 1/16-inch holes on 1/4 inch spacing arrangement. The bed temperature was continuously measured with a thermocouple and controlled with PID controller regulating a fully immersed 500-W electric cartridge heater and varied from 50° C. to 80° C. Sand particles with surface mean particle diameter of 236 microns were used as inert medium. In most studies, the bed was charged with 1 kg sand for a nominal bed height of 6 inches.

Figure 5:
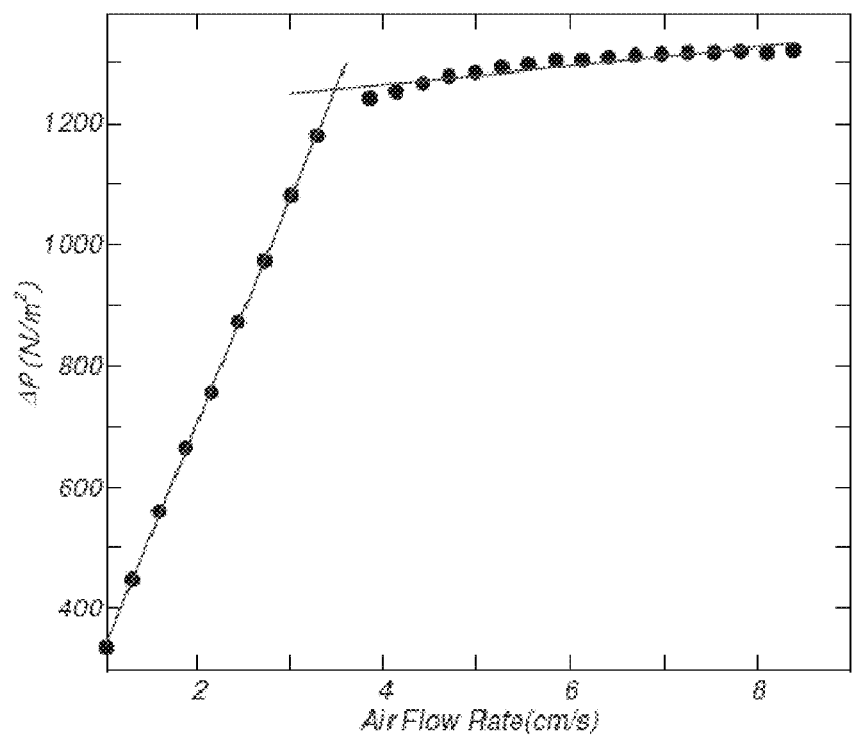
FIG. 5 is a graph of pressure drop versus air flow rate for a fluidized bed dryer.

At the condition of minimum fluidization velocity (onset of fluidization) the force exerted by the upward flowing gas becomes just equal to gravitational force acting on the particles. In other words, the pressure drop across the bed is equal to the apparent weight of the bed particles per unit cross sectional area of the bed. Minimum fluidization velocity was determined by measuring pressure drop (DP) across the bed as a function of gas velocity as the bed passes from fixed bed to the fluidized bed mode. The pressure drop increases with gas velocity until $u_{mf}$ (minimum fluidization velocity) and thereafter it remains almost constant as superficial gas fluidizing velocity ($u_0$) is increased successively beyond umf. Thus, in the plot of pressure drop versus $u_0$, there are two linear sections, one for $u_0 < u_{mf}$ and another for $u_0 > u_{mf}$ as shown in FIG. 5. The intercept of these two lines is taken as minimum fluidization velocity, $u_{mf}$. In the fluidized-bed drying experiments, the gas superficial velocity was varied between 1.5-2.0 $u_{mf}$. Using this method minimum fluidization velocity was found to be 3.31 cm/s.

In order to measure the drying rate of biosolids, a small amount of biosolid, about 10 g, was added into the fluidized bed over a period of 30 seconds. After adding biosolid into the fluidized bed, the humidity and temperature of the exit air were continuously measured by a humidity probe (HTRH-W, TEGAM Inc.) and recorded using the PC and data acquisition system. Knowing the mass flow rate and the humidity of the air into the fluidized bed allowed the drying rate as a function of time to be calculated, as well as the drying temperature at a fixed superficial gas velocity and gas temperature.

Results

Biosolids samples were collected from Truckee Meadows Water Reclamation Facility (TMWRF), in Reno, Nev., which treats 40 mgd of wastewater, the Carson City Water Treatment Plant (CCWTP) in Carson City, Nev., and from the Tahoe Truckee Sanitation Agency (TTSA) in Truckee, Calif. Baseline characterization of sludge i.e. pathogenic activity, initial moisture content and fuel value was established.

Pathogenic Activity:

Samples from TMWRF were delivered to a local firm (Sierra Environmental Monitoring, Inc., in Reno, Nev.) for testing. Pathogenic activity of sludge samples was performed by measuring the total coliform and *E. coli*. The results are presented in Table 5.

TABLE 5

Pathogens present in the biosolid sample

| Parameter | Method | Result | Units |
|---|---|---|---|
| E. Coli | SM 9223 B | $2.1 \times 10^6$ | mpn/100 ml |
| Total Coliform | SM 9223 B | $2.0 \times 10^8$ | mpn/100 ml |

Initial Moisture Measurement

Sludge samples were collected from three regional facilities. The moisture content of each was measured by drying 5 g of sample in an oven at 105° C. for 24 hours, the change in mass being attributed to moisture. Table 6 summarizes the results. The percentage CV is defined as the ratio of the sample standard deviation divided by the sample average.

TABLE 6

Measured initial moisture content of biosolids

| Sample Source | Initial Moisture Content (% w/w) | % CV |
|---|---|---|
| TMWRF, Reno, NV | 85 | 0.35 |
| CCWTP, Carson City, NV | 79 | 0.35 |
| TTSA, CA | 76 | 0.35 |

Fuel Value of Sludge

Sludge samples from 3 regional facilities were delivered to a firm (Galbraith Labs, Inc. in Knoxyille, Tenn.) who measured and reported the fuel value using the standard bomb calorimetric method. The heat of combustion is given in Table 7. The LHV of the dried sludge varied from 16.7 MJ/kg to 23.2 MJ/kg, making it similar in heat content to wood or sub-bituminous coal. The variability of the fuel value from plant to plant can be attributed to different treatment methods for each plant.

TABLE 7

Heat of combustion of biosolids from 3 different wastewater treatment Facilities

| Sample Source | Heat of Combustion (kJ/kg) | | % CV |
|---|---|---|---|
| | Net | Dry | |
| TTSA, CA | 4,060 | 16,729 | 0.66 |
| CCWTP, Carson City, NV | 3,902 | 18,869 | 6.0 |
| TMWRF, Reno, NV | 2,938 | 23,188 | 1.4 |

Figure 6:
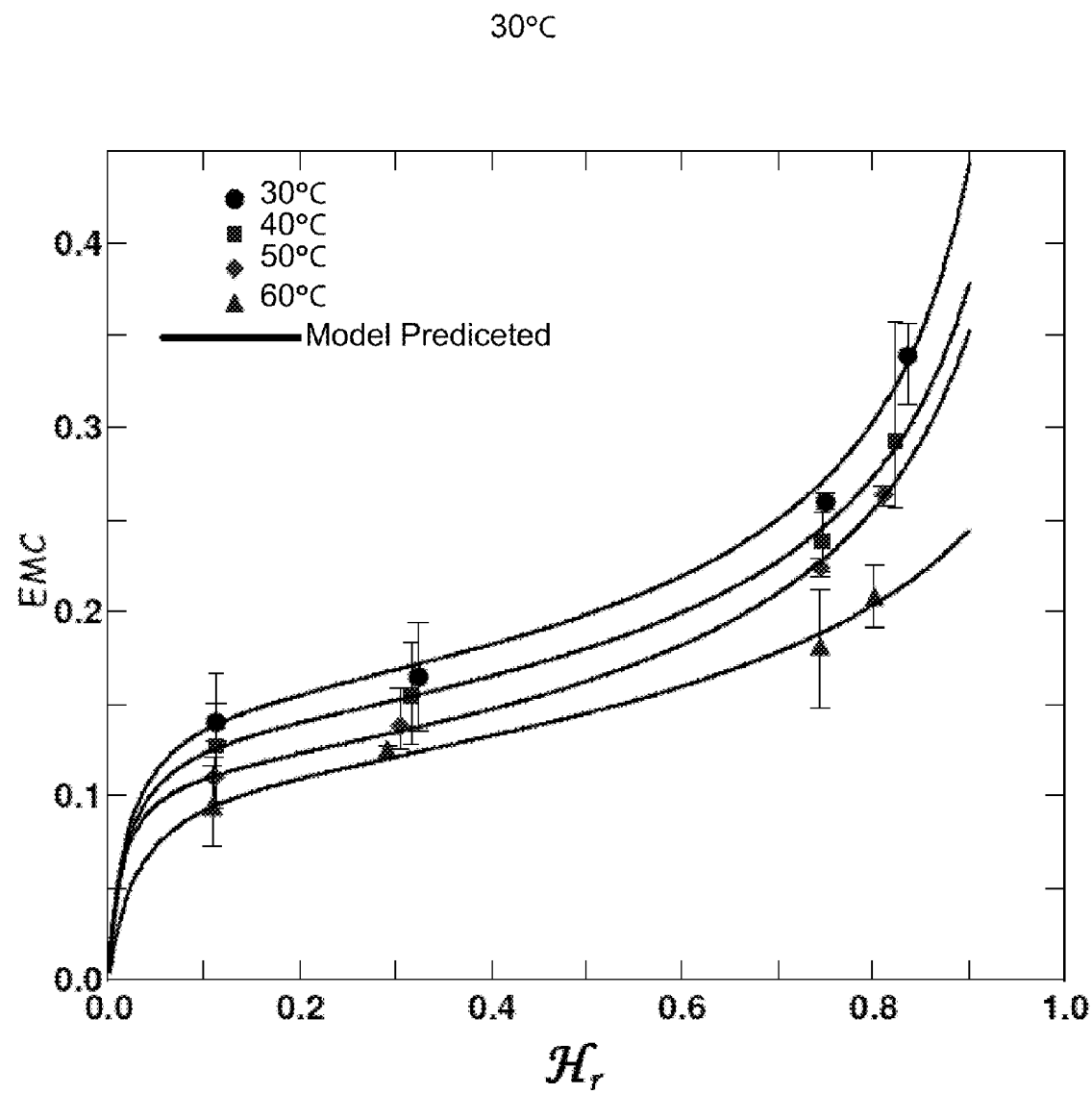
FIG. 6 is a graph of equilibrium moisture content versus relative humidity for biosolids at 30° C., 40° C., 50° C., and 60° C.

Equilibrium Moisture Content:

The EMC of biosolids depends on the relative humidity, temperature of the environment and physical characteristics of biosolids. Desorption isotherms obtained for biosolids at 30, 40, 50, and 60° C. are shown in FIG. 6 along with the isotherm predicted by the VCSM model.

The isotherm follows a characteristic type II (sigmoid shape) classification. The type II isotherms indicate multilayer adsorption. EMC increased with increasing relative humidity for all temperatures. The EMC decreases with an increase in temperature at constant relative humidity. Furthermore, below 30% relative humidity of the drying air, equilibrium moisture ratios exhibited almost constant values. Similar EMC values have been reported for biosolids, but without differentiating between bound and free water.

There are many factors that affect the chemical and physical characteristics of the sludge, including content of the raw sewage, the wastewater treatment process, polymer addition, and salt addition. Behavior of stabilized (digested) sludge is expected to be substantially different from behavior of activated (secondary) sludge. The EMC data were fitted using nonlinear regression analysis method to several well known models.

Figure 7:
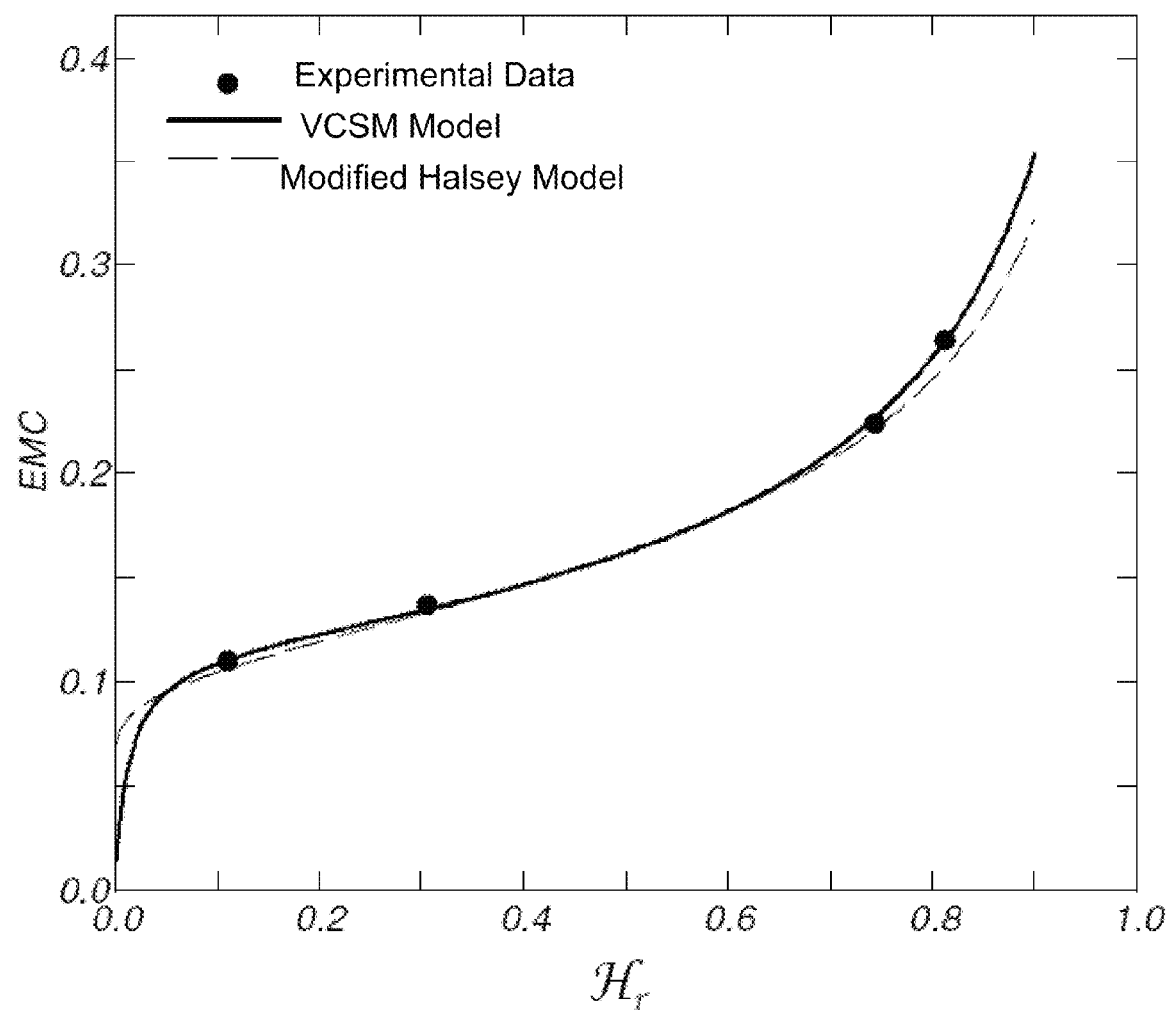
FIG. 7 is a graph of equilibrium moisture content versus relative humidity for biosolids using experimental data, data from the VCSM model, and data from the modified Halsey model.

Models such as modified Henderson, modified Oswin, modified Chung-Pfost underpredict the EMC both at low and high relative humidity conditions and modified Halsey equation slightly underpredicts the EMC at higher relative humidity (>0.7). The modified Halsey model fits the sorption isotherms better than the other models studied. The VCSM model, which accounts for mixing and swelling contributions, fits the data very well as seen in FIG. 6. A plot of measured EMC values at 50° C. is presented in FIG. 7 along with the fitted EMC isotherms based on both modified Halsey and the VCSM model. FIG. 7 indicates the suitability of the VCSM model in predicting the EMC of biosolids. Although the modified Halsey correlation represented the data well, the VCSM model was better able to represent that data at high moisture contents. The VCSM model was found as the most versatile model to accurately describe the water sorption isotherms of type II.

Four desorption isotherms were fit to the VCSM model, shown in FIG. 6, and the fitted parameter values are given in Table 8. Over the temperature range studied, 30-60° C., distinct patterns in the fitted parameters were observed. The Flory-Huggins binary interaction parameter c decreases continuously in this temperature range, from 4.0 to 2.3. This parameter is normally used to analyze polymer-solvent compatibility. The lower its value, the greater the compatibility between polymer and solvent. For c<0.5, good solubility is expected, and the substrate will be fully miscible in the solvent over the entire composition range. Higher values of this parameter (Table 8) indicate poor compatibility of water and the biosolid substrate.

TABLE 8

Parameters of VCSM model at four different temperatures.

| | Model Parameters | | | |
|---|---|---|---|---|
| | $\sigma$ | $\Delta\tilde{\epsilon}$ | $\chi$ | $\tilde{v}_{pw}$ |
| 30° C. | 0.156 | −3.916 | 3.976 | 0.158 |
| 40° C. | 0.138 | −4.068 | 3.149 | 0.171 |
| 50° C. | 0.116 | −4.376 | 2.301 | 0.181 |
| 60° C. | 0.112 | −3.563 | 2.267 | 0.239 |

The adsorption capacity parameter $\sigma$ decreases with increasing temperature somewhat, which may reflect reduced availability of reactive sites. The normalized substrate specific volume $\tilde{v}_{pw}$ increases some with temperature. This may indicate that the thermal expansion of biopolymer substrate is faster than the thermal expansion of water.

The molecular potential energy parameter ($\Delta\bar{\epsilon}$) values are approximately constant over this small temperature range. Note that the value is negative, indicating that the phase change from the free phase to the bound phase releases energy. The value is approximately −4. The magnitude of the number is similar to the dimensionless heat of solidification of water (−2.54).

The VCSM model can be improved by carefully accounting for other contributions to the water chemical potential, such as ionic activity. However, as illustrated above, in its current form this model can be used to gain insight into the equilibrium moisture thermodynamics. The desorption process on a non-homogeneous substrate is intrinsically a complicated process and the emergence of a complicated expression is not necessarily a disadvantage. In fact, the use of a simpler empirical expression could well be a disadvantage as the parameters of the model fail to explain the physical phenomena.

Figure 8:
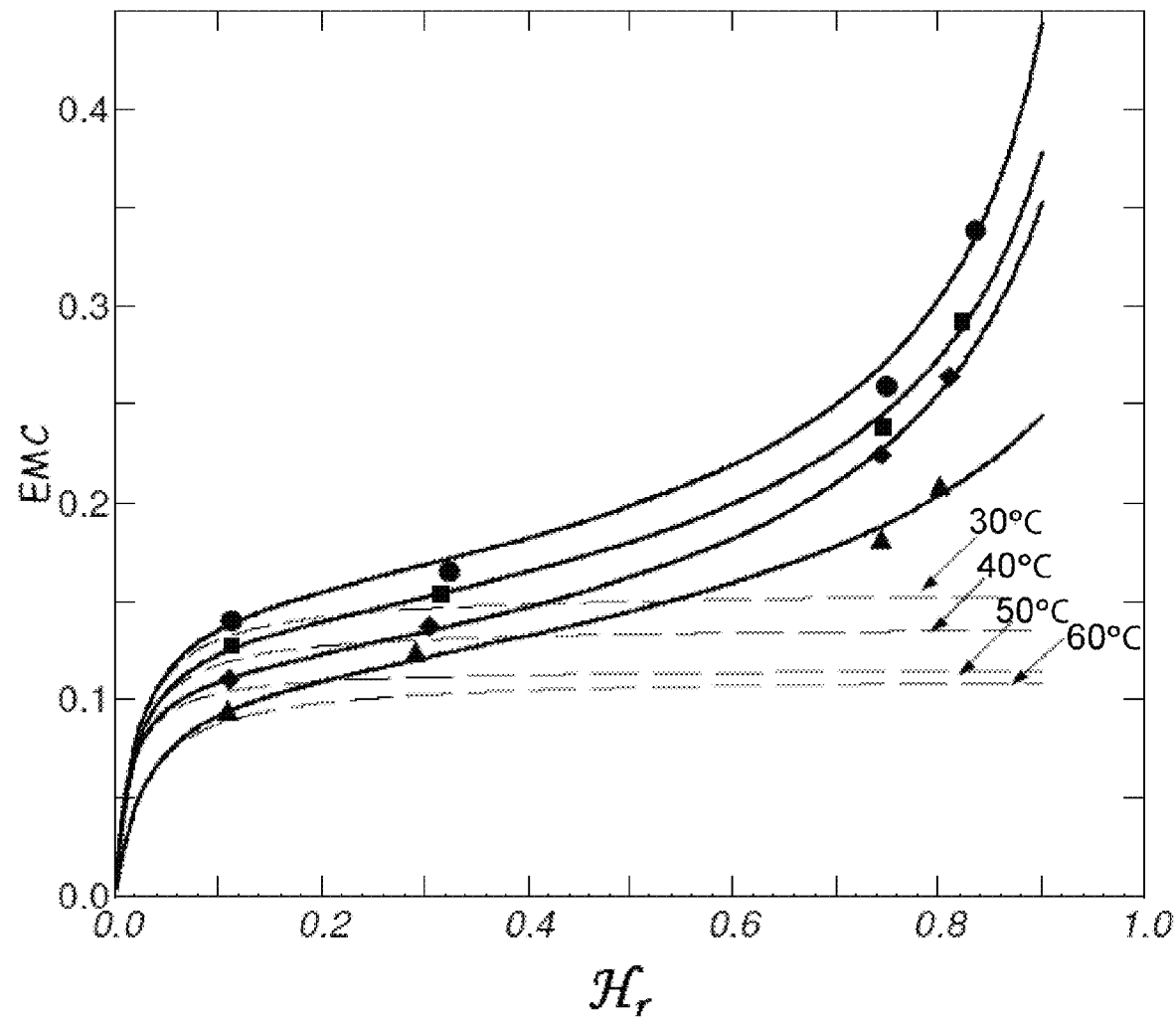
FIG. 8 is a graph of equilibrium moisture content versus relative humidity for biosolids at 30° C., 40° C., 50° C., and 60° C. and total and bound water data predicted using the VCSM model.

The digested sludge from wastewater treatment is generally most difficult to dewater. Due to the presence of solids, all the water within the sludge does not have similar properties in terms of vapor pressure, enthalpy, entropy, viscosity and density. Parameters like particle size, cationic salts, extra cellular polymeric substances, and filamentous bacteria influence its dewaterability. The sorption characteristics of each sludge are expected to differ to a degree. However, this model allows water to be apportioned into two phases, which are called bound and free. It should be understood that those labels are insufficient to describe at a molecular level the attraction between water molecules and bio-polymer substrate. $\theta$ (bound water) and a (free water) can be calculated as described in this disclosure. FIG. 8 shows the isotherms for total moisture and bound water. The bound water (dotted lines) decreases a little with increasing temperature, and at HR values above 10%, is nearly independent of humidity. This is likely due to the greater energy acquired by the adsorbed molecules to evaporate at higher temperatures.

The constant isotherm for bound water at HR greater than 10% indicates that the bound phase is fully saturated, consistent with single-layer adsorption. The free water increases with humidity, and approximately above HR=80%, increases rapidly with humidity. This indicates that water in the free phase may be attracted to water adsorbed at lower humidity, with a stronger attraction. Therefore, it is expected that this free-phase water is more readily eliminated from the biomass than the bound water, with a lower heat of evaporation.

For HR less than about 75%, the bound water is more significant than the free water. So at a higher temperature more water can be removed from the biosolids which has been verified in the fluidized bed drying studies (FIG. 9. This type of plot is very useful in determining the optimum conditions inside the dryer to take out most of the water from the biosolids.

Figure 10:
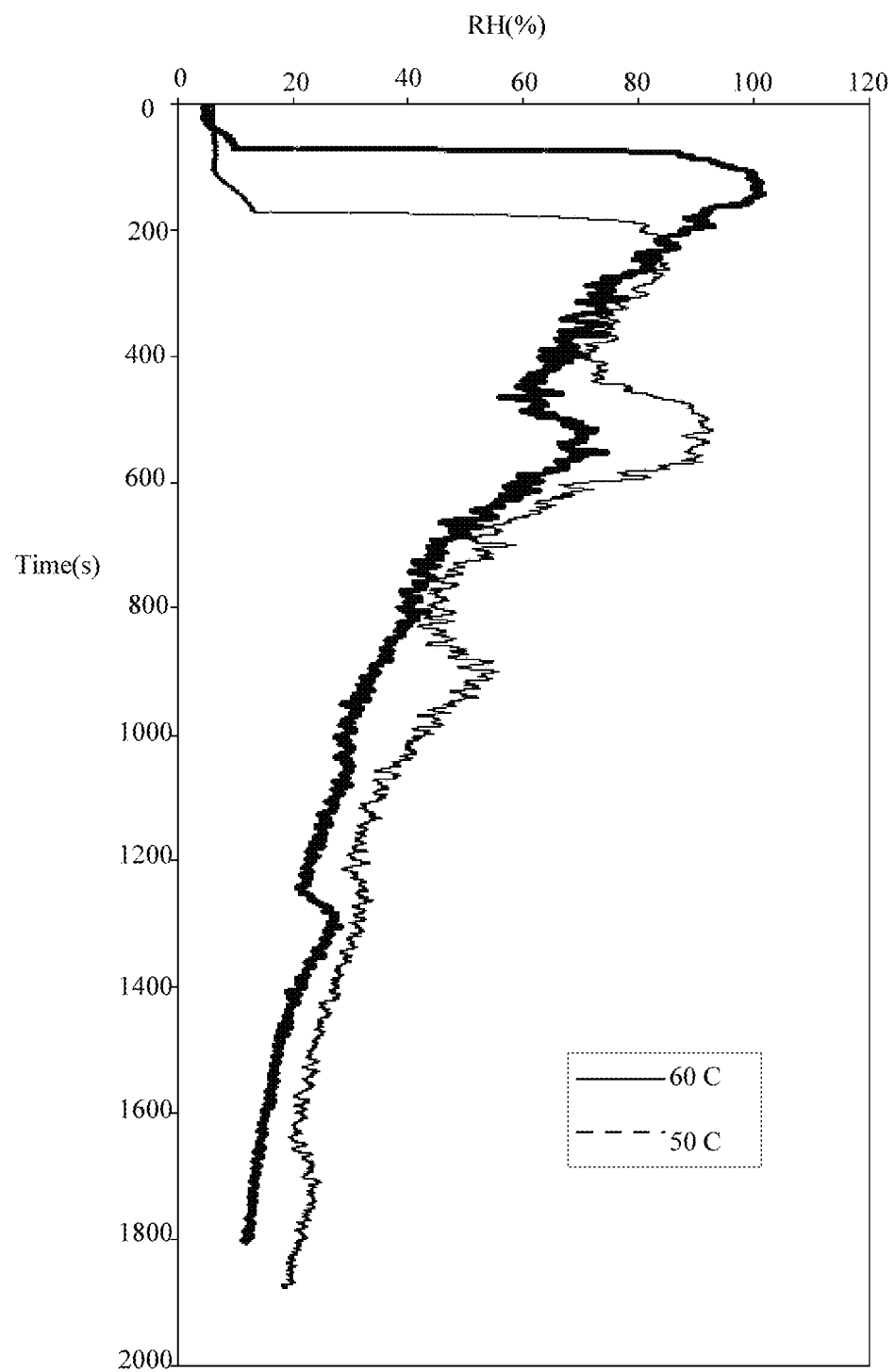
FIG. 10 is a graph of relative humidity versus time for sludge dried at 50° C. and 60° C.

Dryer Analysis:

The moisture content was calculated by measuring the humidity in the effluent air and subtracting that value from the initial moisture of the sludge. Relative humidity of the exhaust air as a function of time at two different temperatures is shown in FIG. 10.

Figure 9:
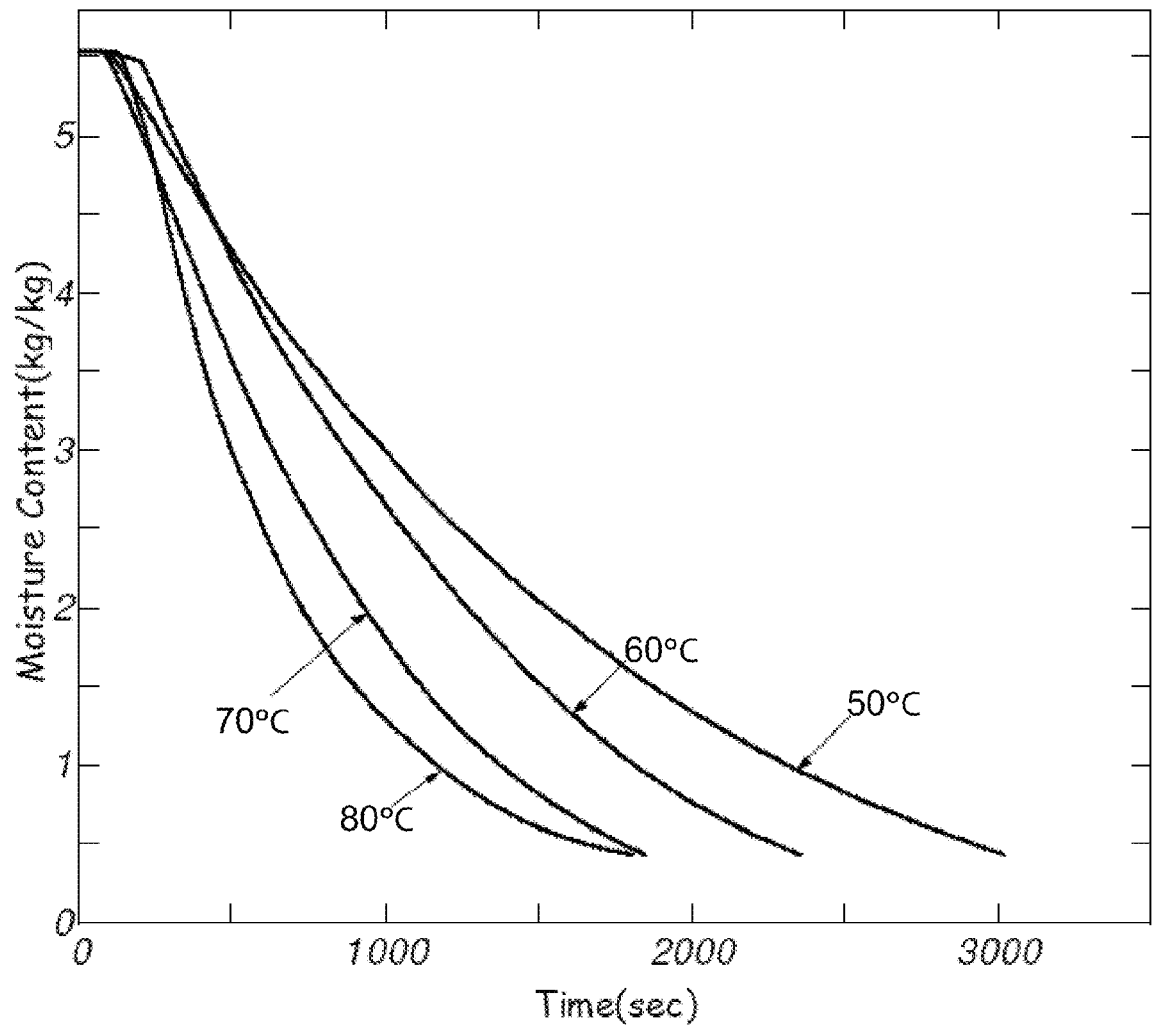
FIG. 9 is a graph of moisture content versus time for sludge dried at 50° C., 60° C., 70° C., and 80° C.

The sludge moisture was determined as a function of time in batch fluidized-bed drying tests, shown in FIG. 9. Here, moisture content is plotted as a mass ratio (water to dry solids). The air flow rate for each of these measurements was 50% more than the minimum required for fluidization. The time required to reach a moisture ratio of 50% for the given conditions is 48.3 min at 50° C., and 27.5 min at 80° C.

As discussed above, the free moisture is a relatively strong function of temperature, while the bound moisture is not. This would seem to be consistent with the drying results shown in FIG. 11, which presents a typical drying curve with the rate of drying (per area of fluidized-bed cross section) as a function of the moisture content. For many solids, a period of constant rate drying would be expected, representative of free moisture evaporating from the exposed surface of a solid, followed by a falling rate period. These tests do not show a period of constant rate, consistent with other results. This implies that the rate of drying is strictly limited by internal mass transfer.

Figure 11:
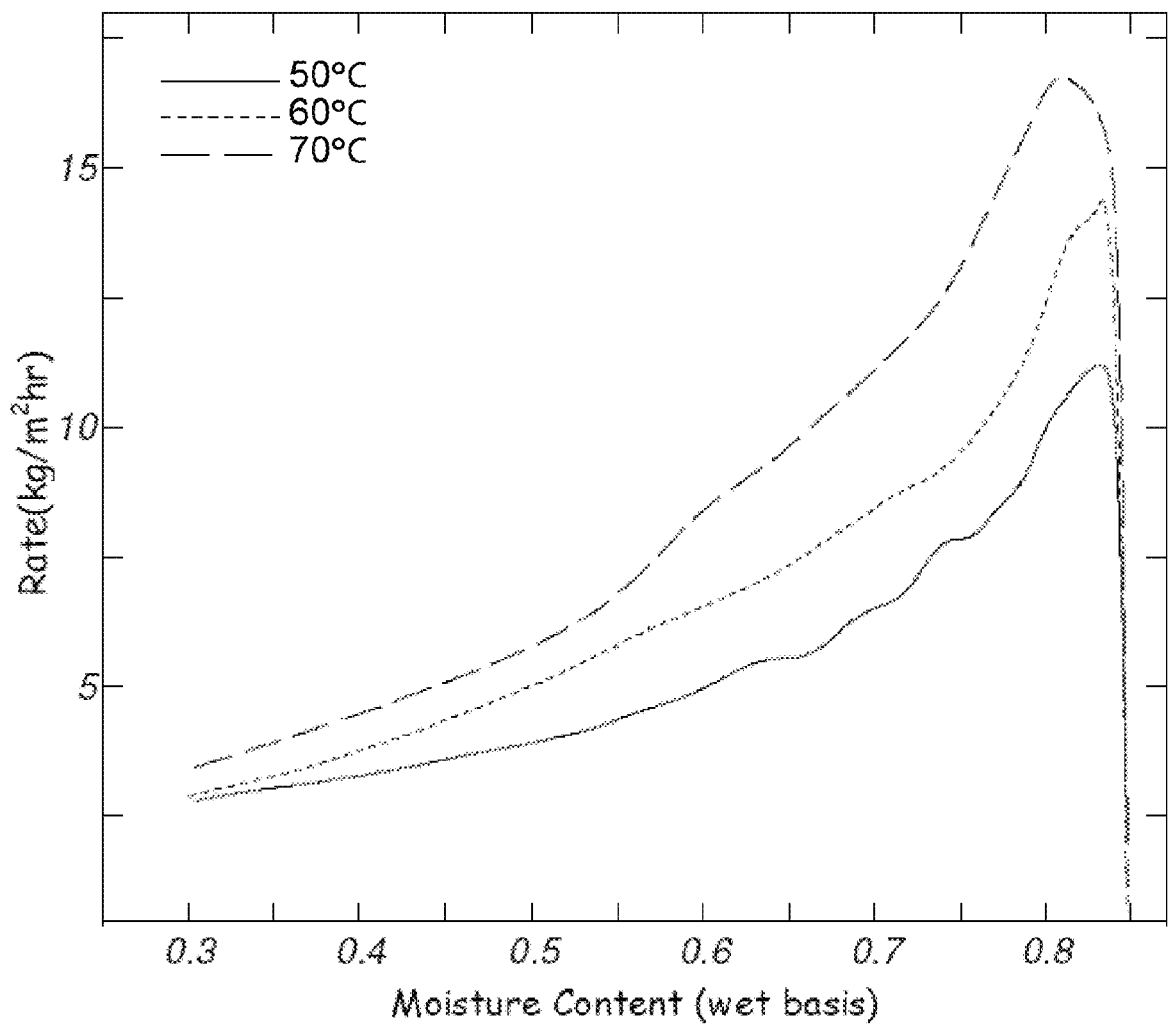
FIG. 11 is a graph of drying rate versus moisture content for sludge dried at 50° C., 60° C., and 70° C.

This is not surprising for such a complex heterogeneous polymer, which is expected to have a highly complex morphology. FIG. 11 shows that the rate of drying is lowest at the lower temperatures. This is expected, since the bound moisture is lower at higher temperatures, so the driving force for drying is greatest at higher temperatures.

Figure 12:
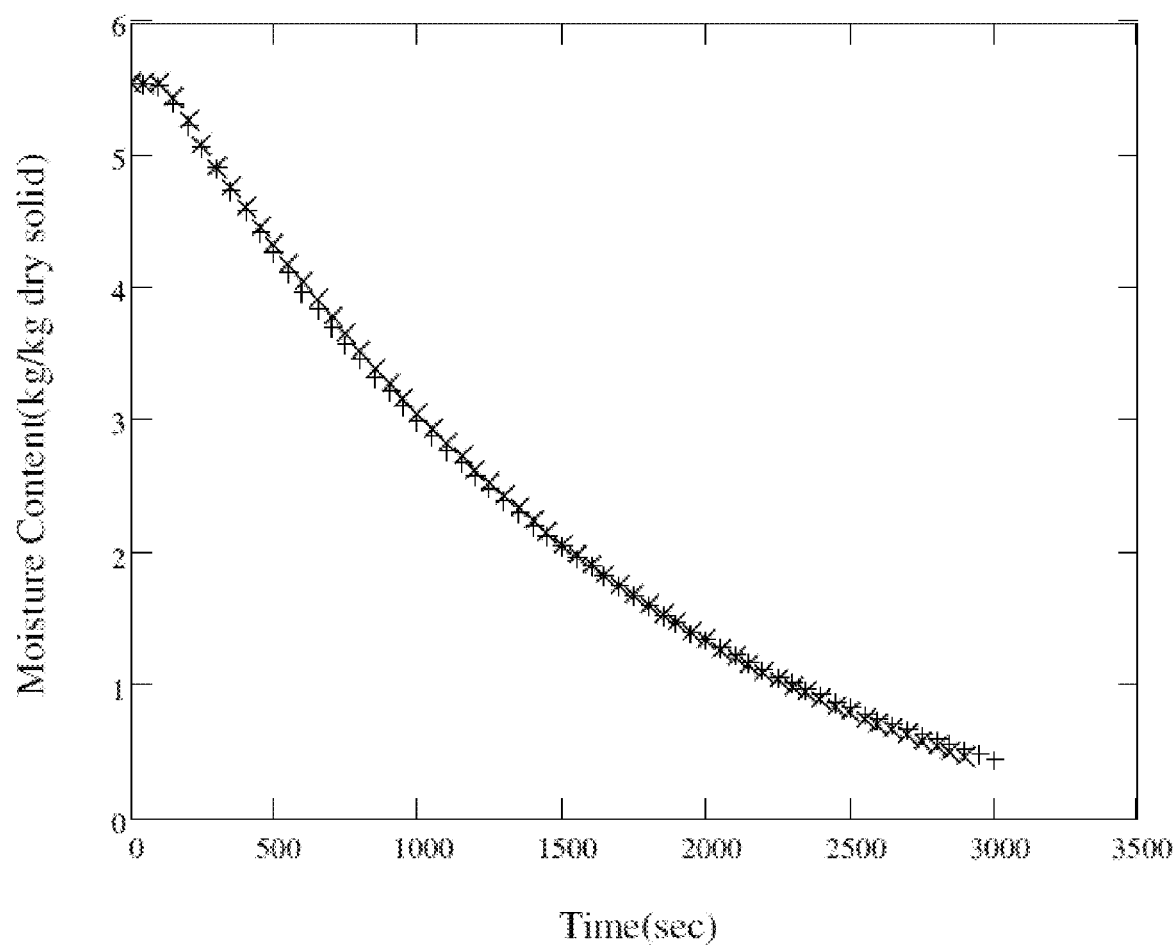
FIG. 12 is a graph of moisture content versus time for sludge dried at 50° C. at velocities of 7 cm/s and 5.2 cm/s.

FIG. 12 illustrates the insignificant effect of air flow rate on the rate of drying at 50° C. An increased gas flow rate should increase the rate of mass transfer between the solids and the gas. Apparently, the rate of drying the sludge under these conditions is not limited by external convection, but by internal mass transfer. The rate of mass transfer may be limited by capillary diffusion, by internal vapor diffusion, or by diffusion across cell walls. If internal mass transfer is the rate limiting step, then it can be expected that the rate of drying can be increased by reducing the size of the wet particles. It is expected that the vigorous motion and mixing induced by gas bubbles in a fluidized bed should have a positive influence on the rate of drying, by forcing fragmentation of wet sludge particles. Thus, fluidization promotes fragmentation, which has a beneficial affect on drying.

EXAMPLE 2

Integrated Process Flowsheet for Electricity Generation from Sludge

Drying the sludge is the first step in transforming the waste into electricity. The fuel is converted to electricity, such as by using air gasification to produce a fuel gas, followed by combustion of the gas in a generator, which in turn generates electrical power. Drying can require a substantial amount of heat, so careful heat integration throughout the process can be important for technical and economic feasibility. The integrated process includes a dryer, a gasifier, a gas generator, and heat exchangers for heat integration.

The present disclosure provides a complete flowsheet to maximize heat integration. The dried fuel is sent to a gasifier, which produces a fuel gas. The fuel gas is burned in a generator for production of electricity. Heat is recovered from the generator to be used in the dryer. FIG. 1 shows the simplified flowsheet for this process. The dryer has been considered in detail above, so the gasifier and the generator will be considered here.

The gasifier is designed as a bubbling fluidized bed reactor, with air as the fluidizing gas supplied at a 30% equivalence ratio. At 100% equivalence ratio, the exact amount of Oxygen required for complete combustion is supplied. The gasifier is adiabatic, and, in one example, operates at 850° C. Dried fuel is fed into the reactor, and mixes rapidly with the hot sand. This causes the fuel to very rapidly heat, and volatilize. The partial fuel oxidation is very exothermic. The result of the gasification (partial oxidation) is that the gas contains no, or very little, oxygen, but substantial quantities of $CO$, $CO_2$, $H_2$, CH$_4$, and H$_2$O, along with large quantities of nitrogen. Table 9 gives the expected gas composition of this synthesis gas. The fuel value of the gas is typically about 3.08 kJ/L at standard temperature and pressure.

40% (dry basis, w/w) of the sludge consists of inert solids, which becomes ash in the gasification reactor, and 3.6% becomes char. These solid products are removed continuously from the reactor entrained in the fuel gas as small particulates, and separated in a cyclone separator. Potentially, the char can be further exploited by oxidation in a separate unit to recover the fuel value as heat. Char and ash represent a solid waste which typically must be disposed of, but are only 6.5% of the weight of the sludge.

| Gas | Mole Fraction (%) |
|---|---|
| CO | 7.5% |
| CO$_2$ | 15.1% |
| CH$_4$ | 1.6% |
| H$_2$O | 10.9% |
| H$_2$ | 17.0% |
| N$_2$ | 47.9% |
| O$_2$ | 0.0% |

Gasification reactions typically produce large molecules that condense at relatively high temperatures, usually called tars. Typically, only a small amount of tars are generated, but its sticky nature can cause significant operating problems. There has been much work published recently on the development of catalysts for elimination of tars in biomass gasification, which likely will provide a feasible solution for this process. For this design, the assumption is made that catalyst will be available in the fluidized-bed gasifier for elimination of tars.

The fuel gas leaves the reactor through a gas cyclone, after which it is cooled. The heat recovered is used to preheat the fluidizing air in the dryer. Subsequently, the fuel gas is charged to a gas generator, where it is burned with air, to turn a turbine and generate electrical power. In one example, the generator produces power with 35% efficiency, and 90% of the sensible heat in the exhaust is recovered for use in the dryer.

As described above, heat is recovered from the exhaust gas from the gasifier, and from the exhaust gas from the generator. In one example, that heat is sufficient to dry the sludge to a fuel with 30% moisture, provided that the sludge has moisture less than 75%. Many POTW sludges have moisture greater than 75%, so, in some examples, heat must be provided from an external source, if the moisture in the sludge is to be brought down to 30%, as desired. This heat might be found onsite, since most modern POTWs include an anaerobic digester. The digester produces a fuel gas (as well as the sludge). The fuel gas (or bio gas) is usually burned onsite, either as an open flare, or to generate power. In either case, that gas might be mixed into the fuel gas produced from the gasification, increasing the power generated, and increasing the heat available for recovery. Calculations show that this amount of heat is well in excess of the heat required to produce a dry fuel from sludge with initial moisture content of 85%. The design calculations for heat exchange have assumed that all the heat required for the dryer will be recovered from the generator exhaust, assuming that sufficient fuel gas is supplied.

It is to be understood that the above discussion provides a detailed description of various embodiments. The above descriptions will enable those of ordinary skill in the art to make and use the disclosed embodiments, and to make departures from the particular examples described above to provide embodiments of the methods and apparatuses constructed in accordance with the present disclosure. The embodiments are illustrative, and not intended to limit the scope of the present disclosure. The scope of the present disclosure is rather to be determined by the scope of the claims as issued and equivalents thereto.

We claim:

1. A drying apparatus configured to dry a feed material, the feed material having a first density, the drying apparatus comprising:
    a feed material inlet; the feed material inlet configured to supply a feed material to be dried to the drying apparatus and produce dried feed material;
    a bed coupled to the feed material inlet and having a dried feed material outlet, the bed comprising fluidized bed media, the fluidized bed media comprising a different material from the feed material and having a second density, the second density being different than the first density;
    a heat source coupled to the bed; and
    a fluid source coupled to the bed, the fluid source configured to supply a fluid to agitate the fluidized bed material and the feed;
    wherein the fluidized bed media dries the feed material and density differences between the first density and the second density cause the dried feed material to be selectively removed from the bed through the dried feed material outlet.

2. The drying apparatus of claim 1, further comprising a gravity separator fluidly coupled to the dried feed material outlet of the bed, wherein the gravity separator separates fluid from the dried feed material.

3. The drying apparatus of claim 2, wherein the gravity separator comprises a cyclone.

4. The drying apparatus of claim 1, wherein the second density is greater than the first density.

5. The drying apparatus of claim 1, wherein the fluidized bed media comprises inert particles.

6. The drying apparatus of claim 1, wherein the fluidized bed media comprises sand.

7. The drying apparatus of claim 1, wherein the fluidized bed media is not dried feed material.

8. The drying apparatus of claim 1, wherein the apparatus does not include a feedback loop to return at least a portion of the dried feed material to the bed.

9. The drying apparatus of claim 1, the bed comprising tubes coupled to the heat source.

* * * * *